United States Patent
Jain et al.

(10) Patent No.: US 12,277,400 B1
(45) Date of Patent: Apr. 15, 2025

(54) MULTIMEDIA CONTENT MANAGEMENT FOR LARGE LANGUAGE MODEL(S) AND/OR OTHER GENERATIVE MODEL(S)

(71) Applicant: GOOGLE LLC, Mountain View, CA (US)

(72) Inventors: Sanil Jain, Sunnyvale, CA (US); Wei Yu, Mountain View, CA (US); Ágoston Weisz, Zurich (CH); Michael Andrew Goodman, Oakland, CA (US); Diana Avram, Zurich (CH); Amin Ghafouri, San Francisco, CA (US); Golnaz Ghiasi, Mountain View, CA (US); Igor Petrovski, Zurich (CH); Khyatti Gupta, Zurich (CH); Oscar Akerlund, Zurich (CH); Evgeny Sluzhaev, Zurich (CH); Rakesh Shivanna, Sunnyvale, CA (US); Thang Luong, Santa Clara, CA (US); Komal Singh, Kitchener (CA); Yifeng Lu, Mountain View, CA (US); Vikas Peswani, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/590,498

(22) Filed: Feb. 28, 2024

Related U.S. Application Data

(63) Continuation of application No. 18/520,218, filed on Nov. 27, 2023, now Pat. No. 11,947,923.

(51) Int. Cl.
*G06F 40/40* (2020.01)
*G06V 10/70* (2022.01)

(52) U.S. Cl.
CPC .............. *G06F 40/40* (2020.01); *G06V 10/70* (2022.01)

(58) Field of Classification Search
CPC .............................. G06F 40/40; G06V 10/70
(Continued)

(56) References Cited

U.S. PATENT DOCUMENTS 11,358,063 B2  6/2022  Ashoori
11,769,017 B1  9/2023  Gray
(Continued)

OTHER PUBLICATIONS

Du, H. et al., "Spear or Shield: Leveraging Generative AI to Tackle Security Threats of Intelligent Network Services"; arXiv.org, Cornell University; arXiv:2306.02384; 9 pages; dated Jun. 4, 2023.
(Continued)

*Primary Examiner* — Thierry L Pham
(74) *Attorney, Agent, or Firm* — Gray Ice Higdon

(57) ABSTRACT

Implementations relate to managing multimedia content that is obtained by large language model(s) (LLM(s)) and/or generated by other generative model(s). Processor(s) of a system can: receive natural language (NL) based input that requests multimedia content, generate a response that is responsive to the NL based input, and cause the response to be rendered. In some implementations, and in generating the response, the processor(s) can process, using a LLM, LLM input to generate LLM output, and determine, based on the LLM output, at least multimedia content to be included in the response. Further, the processor(s) can evaluate the multimedia content to determine whether it should be included in the response. In response to determining that the multimedia content should not be included in the response, the processor(s) can cause the response, including alternative multimedia content or other textual content, to be rendered.

20 Claims, 10 Drawing Sheets

(58) Field of Classification Search
USPC .............................................................. 704/9
See application file for complete search history.

(56) References Cited

U.S. PATENT DOCUMENTS 11,875,240 B1　1/2024　Bosnjakovic
11,947,923 B1　4/2024　Jain

OTHER PUBLICATIONS

Chen, X. et al., "Next Steps for Human-Centered Generative AI: A Technical Perspective"; arXiv, Cornell University; arXiv:2306.15774; 34 pages; dated Jun. 27, 2023.
European Patent Office; International Search Report and Written Opinion issued in Application No. PCT/US2024/050037; 10 pages; dated Jan. 28, 2025.

MULTIMEDIA CONTENT MANAGEMENT FOR LARGE LANGUAGE MODEL(S) AND/OR OTHER GENERATIVE MODEL(S)

BACKGROUND

Various generative models have been proposed that can be used to process natural language (NL) content and/or other input(s), to generate output that reflects generative content that is responsive to the input(s). For example, large language models (LLM(s)) have been developed that can be used to process NL content and/or other input(s), to generate LLM output that reflects generative NL content and/or other generative content that is responsive to the input(s). These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate a response that is responsive to the NL based input and that is to be rendered at the client device. In many instances, these LLMs can cause textual content to be included in the response. In some instances, these LLMs can additionally, or alternatively, cause multimedia content, such as images, to be included in the response (e.g., based on causing image retrieval to be performed, based on causing image generation models to generate images, etc.).

However, some multimedia content, even if it can be obtained by these LLMs for inclusion in the response, should not be rendered as part of the response. For example, some multimedia content that can be obtained by these LLMs can compromise data security of the user of the client device or of other users. As another example, some multimedia content that can be obtained by these LLMs can be utilized in furtherance of nefarious activity. Accordingly, there is a need in the art to mitigate and/or eliminate instances of multimedia content that is obtained by these LLMs from compromising data security of users and/or being utilized in furtherance of nefarious activity, and in computationally efficient manner.

SUMMARY

Implementations described herein relate to managing multimedia content that is obtained by large language model(s) (LLM(s)) and/or generated by other generative model(s), and that is to be rendered as part of a response generated by the LLM(s). Processor(s) of a system can: receive natural language (NL) based input that requests multimedia content, generate a response that is responsive to the NL based input, and cause the response to be rendered. In some implementations, and in generating the response, the processor(s) can process, using a LLM, LLM input to generate LLM output, and determine, based on the LLM output, at least the multimedia content to be included in the response. In some versions of those implementations, the processor(s) can evaluate the multimedia content to determine whether it should be included in the response that is to be rendered responsive to the NL based input. In response to determining that the multimedia content that is obtained and/or generated should not be included in the response, the processor(s) can cause the response, including alternative multimedia content or other textual content and in lieu of the multimedia content, to be rendered responsive to the NL based input.

For example, assume that the NL based input is a prompt of "show me an image of a nerdy attorney". In this example, the processor(s) can determine that a patent attorney is the nerdiest type of attorney given the underlying scientific background required to become a patent attorney and can obtain an image of an actual patent attorney to be included in the response. However, and prior to causing the response, including the image of the actual patent attorney, to be rendered responsive to the NL based input, the processor(s) can evaluate the multimedia content to determine whether it should be included in the response. In evaluating the multimedia content, the processor(s) can utilize various evaluation model(s) and/or evaluation techniques described herein to determine whether the multimedia content should be included in the response to be rendered at the client device and/or a reason for whether the multimedia content should be included in the response to be rendered at the client device. In this example, the evaluation may indicate that inclusion of the image of the actual patent attorney may compromise data security of the actual patent attorney that is included in the image. Accordingly, the processor(s) can attempt to obtain another image of a patent attorney (e.g., a generative image of a patent attorney that does depict an actual patent attorney) to be included in the response and in lieu of the image that was initially obtained and/or can determine the canned textual content and/or the other textual content to be included in the response and in lieu of the image that was initially obtained. As a result, these techniques mitigate and/or eliminate instances of multimedia content that is obtained by these LLMs from compromising data security of users and/or being utilized in furtherance of nefarious activity, and in a computationally efficient manner.

In additional or alternative versions of those implementations, the processor(s) can, while the multimedia content is being obtained and/or generated, determine whether to continue obtaining the multimedia content based on one or more signals. In response to determining to refrain from continuing obtaining the multimedia content, the processor(s) can cancel the obtaining of the multimedia content and can cause the response, including alternative multimedia content or other textual content and in lieu of the multimedia content, to be rendered responsive to the NL based input. The one or more signals can include, for example, an NL based input context given the NL based input with respect to the multimedia content requested by the NL based input, a multimedia content context given the multimedia content requested by the NL based input with respect to the NL based input, a response context given the multimedia content requested by the NL based input with respect to the textual content, and/or other signals.

For example, again assume that the NL based input is a prompt of "show me an image of a nerdy attorney". In this example, the processor(s) can again determine that a patent attorney is the nerdiest type of attorney given the underlying scientific background required to become a patent attorney and can initiate obtaining of an image of an actual patent attorney to be included in the response. However, and while obtaining the image of the actual patent attorney to be rendered responsive to the NL based input, the processor(s) can evaluate the one or more signals and without the context of the actual multimedia content that is to be obtained to determine whether the multimedia content that will be obtained should be included in the response to be rendered at the client device. In this example, the obtaining of the image of the actual patent attorney may be halted if the processor(s) determine that the image of the actual patent attorney should not be rendered in the context of the NL based input that was received, if multimedia content queries utilized to obtain the image of the actual patent attorney should not have been utilized (e.g., due to location information of the user being included in the multimedia content queries), if the multimedia content queries utilized to obtain the image of the actual patent attorney should not have been utilized given surrounding textual content to be included in the response (e.g., identifying a name and/or place of business of the actual patent attorney), and so on. Accordingly, the processor(s) can attempt to obtain another image of a patent attorney (e.g., a generative image of a patent attorney that does depict an actual patent attorney) to be included in the response and in lieu of the image that was initially obtained and/or can determine the canned textual content and/or the other textual content to be included in the response and in lieu of the image that was initially obtained. As a result, these techniques mitigate and/or eliminate instances of multimedia content that is obtained by these LLMs from compromising data security of users and/or being utilized in furtherance of nefarious activity, and in a computationally efficient manner while also balancing latency.

In additional or alternative versions of those implementations, the processor(s) can, when the NL based input is received, determine whether to obtain the multimedia content that was requested based on the NL based input itself and prior to initiating obtaining of the multimedia content that was requested. In response to determining to refrain from initiating obtaining the multimedia content that was requested, the processor(s) can cause the response, including alternative multimedia content or other textual content and in lieu of the multimedia content, to be rendered responsive to the NL based input. Notably, and in contrast with the above mentioned implementations, the processor(s) may not even attempt to obtain the multimedia content.

For example, again assume that the NL based input is a prompt of "show me an image of a nerdy attorney". In this example, the processor(s) can again determine that a patent attorney is the nerdiest type of attorney given the underlying scientific background required to become a patent attorney and can initiate obtaining of an image of an actual patent attorney to be included in the response. However, and prior to initiating obtaining of the image of the actual patent attorney to be rendered responsive to the NL based input, the processor(s) can determine that the multimedia content that is requested by the user in the NL based input should not be obtained. Accordingly, the processor(s) can determine the canned textual content and/or the other textual content to be included in the response and in lieu of the image that was initially obtained (e.g., "how about I generate an image of a nerdy attorney"). As a result, these techniques mitigate and/or eliminate instances of multimedia content that is obtained by these LLMs from compromising data security of users and/or being utilized in furtherance of nefarious activity, and in a computationally efficient manner while also balancing latency.

The above description is provided as an overview of some implementations of the present disclosure. Further description of those implementations, and other implementations, are described in more detail below.

DETAILED DESCRIPTION OF THE DRAWINGS

Figure 1:
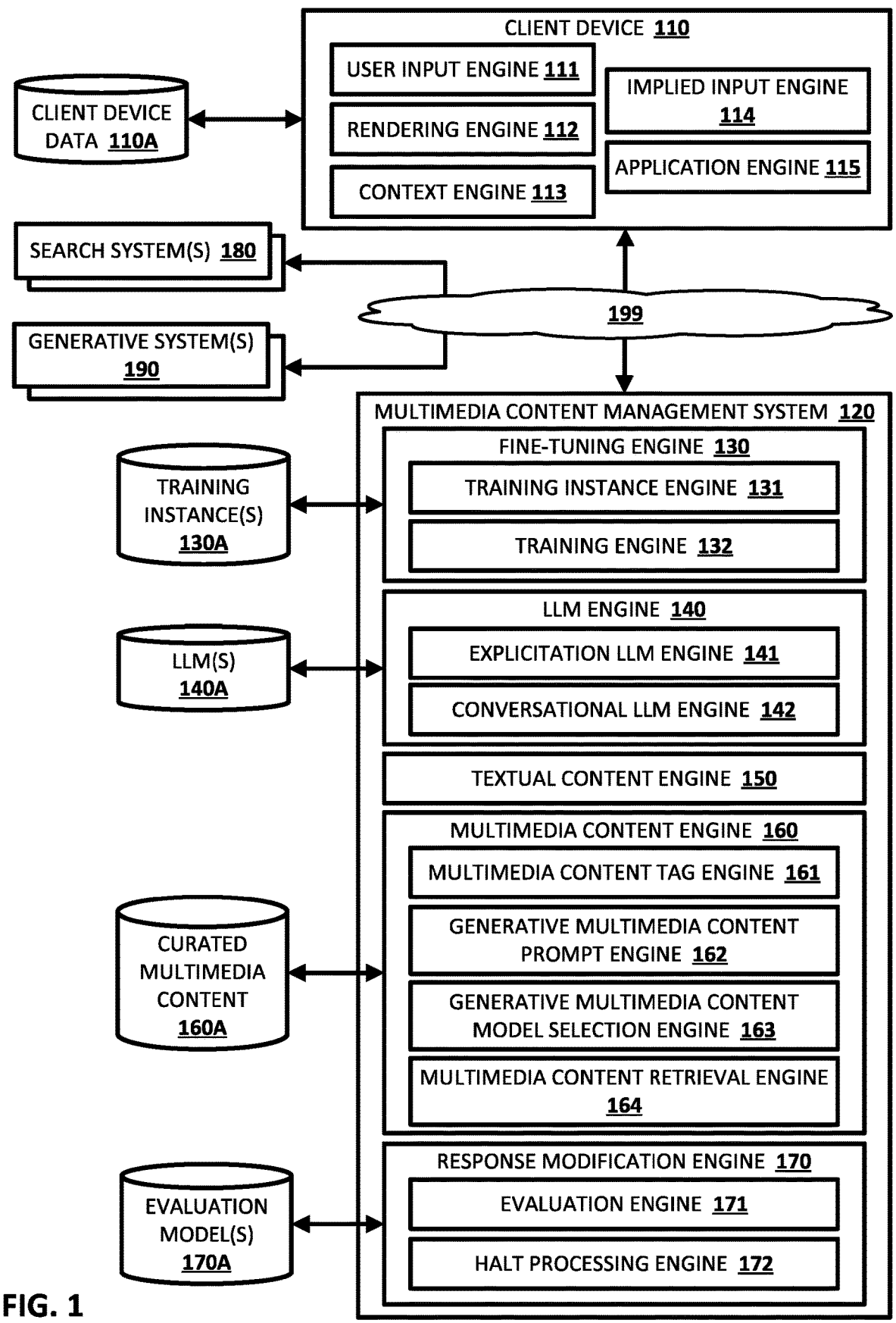
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a multimedia content management system 120. In some implementations, all or aspects of the multimedia content management system 120 can be implemented locally at the client device 110. In additional or alternative implementations, all or aspects of the multimedia content management system 120 can be implemented remotely from the client device 110 as depicted in FIG. 1 (e.g., at remote server(s)). In those implementations, the client device 110 and the multimedia content management system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or response(s) that are responsive to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with or otherwise provide access to (e.g., as a frontend) the multimedia content management system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to typed and/or touch inputs directed to the client device 110.

Some instances of a NL based input described herein can be a query for a response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), or an image or video query that is based on vision data captured by vision component(s) of the client device 110 (or based on NL input generated based on processing the image using, for example, object detection model(s), captioning model(s), etc.). Other instances of a NL based input described herein can be a prompt for content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image or video prompt that is based on an image or video captured by a vision component of the client device 110.

In various implementations, the client device 110 can include a rendering engine 112 that is configured to render content (e.g., uni-modal responses that include only textual content or only multimedia content, multi-modal responses that include both textual content and multimedia content, an indication of source(s) associated with portion(s) of the uni-modal and/or multi-modal responses, and/or other content) for audible and/or visual presentation to a user of the client device 110 using one or more user interface output devices. For example, the client device 110 can be equipped with one or more speakers that enable audible content to be provided for audible presentation to the user via the client device 110. Additionally, or alternatively, the client device 110 can be equipped with a display or projector that enables textual content or other visual content (e.g., image(s), video(s), etc.) to be provided for visual presentation to the user via the client device 110.

In various implementations, the client device 110 can include a context engine 113 that is configured to determine a client device context (e.g., current or recent context) of the client device 110 and/or a user context of a user of the client device 110 (or an active user of the client device 110 when the client device 110 is associated with multiple users). In some of those implementations, the context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location(s) of the client device 110 and/or a geographical region associated with a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the client device data database 110A or otherwise.

For example, the context engine 113 can determine a current context based on a current state of a dialog session (e.g., considering one or more recent NL based inputs provided by a user during the dialog session), profile data, and/or a current location of the client device 110. For instance, the context engine 113 can determine a current context of "visitor looking for upcoming events in Louisville, Kentucky" based on a recently issued query, profile data, and an anticipated future location of the client device 110 (e.g., based on recently booked hotel accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., a response) for an implied NL based input.

In various implementations, the client device 110 can include an implied input engine 114 that is configured to: generate an implied NL based input independent of any user explicit NL based input provided by a user of the client device 110; submit an implied NL based input, optionally independent of any user explicit NL based input that requests submission of the implied NL based input; and/or cause rendering of search result(s) or a response for the implied NL based input, optionally independent of any explicit NL based input that requests rendering of the search result(s) or the response. For example, the implied input engine 114 can use one or more past or current contexts, from the context engine 113, in generating an implied NL based input, determining to submit the implied NL based input, and/or in determining to cause rendering of search result(s) or a response that is responsive to the implied NL based input. For instance, the implied input engine 114 can automatically generate and automatically submit an implied query or implied prompt based on the one or more past or current contexts. Further, the implied input engine 114 can automatically push the search result(s) or the response that is generated responsive to the implied query or implied prompt to cause them to be automatically rendered or can automatically push a notification of the search result(s) or the response, such as a selectable notification that, when selected, causes rendering of the search result(s) or the response. Additionally, or alternatively, the implied input engine 114 can submit respective implied NL based input at regular or non-regular intervals, and cause respective search result(s) or respective responses to be automatically provided (or a notification thereof automatically provided). For instance, the implied NL based input can be "patent news" based on the one or more past or current contexts indicating a user's general interest in patents, the implied NL based input or a variation thereof periodically submitted, and the respective search result(s) or the respective responses can be automatically provided (or a notification thereof automatically provided). It is noted that the respective search result(s) or the response can vary over time in view of, e.g., presence of new/fresh search result document(s) over time.

Further, the client device 110 and/or the multimedia content management system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The multimedia content management system 120 is illustrated in FIG. 1 as including a fine-tuning engine 130, a LLM engine 140, a textual content engine 150, a multimedia content engine 160, and a response modification engine 170. Some of these engines can be combined and/or omitted in various implementations. Further, these engines can include various sub-engines. For instance, the fine-tuning engine 130 is illustrated in FIG. 1 as including a training instance engine 131 and a training engine 132. Further, the LLM engine 140 is illustrated in FIG. 1 as including an explicitation LLM engine 141 and a conversational LLM engine 142. Moreover, the multimedia content engine 160 is illustrated in FIG. 1 as including a multimedia content tag engine 161, a generative multimedia content prompt engine 162, a generative multimedia content model selection engine 163, and a multimedia content retrieval engine 164. Furthermore, the response modification engine 170 is depicted in FIG. 1 as including an evaluation engine 171 and a halt processing engine 172. Similarly, some of these sub-engines can be combined and/or omitted in various implementations. Accordingly, it should be understood that the various engines and sub-engines of the multimedia content management system 120 illustrated in FIG. 1 are depicted for the sake of describing certain functionalities and is not meant to be limiting.

Further, the multimedia content management system 120 is illustrated in FIG. 1 as interfacing with various databases, such as training instance(s) database 130A, LLM(s) database 140A, curated multimedia content database 160A, and evaluation model(s) database 170A. Although particular engines and/or sub-engines are depicted as having access to particular databases, it should be understood that is for the sake of example and is not meant to be limiting. For instance, in some implementations, each of the various engines and/or sub-engines of the multimedia content management system 120 may have access to each of the various databases. Further, some of these databases can be combined and/or omitted in various implementations. Accordingly, it should be understood that the various databases interfacing with the multimedia content management system 120 illustrated in FIG. 1 are depicted for the sake of describing certain data that is accessible to the multimedia content management system 120 and is not meant to be limiting.

Moreover, the multimedia content management system 120 is illustrated in FIG. 1 as interfacing with other system(s), such as search system(s) 180 and generative system(s) 190. In addition to multimedia content that is included in the curated multimedia content database 160A, the multimedia content retrieval engine 164 can generate and transmit requests the search system(s) 180 and/or the generative system(s) 190 to obtain multimedia content to be included in a response that is responsive to an NL based input as described herein. In some implementations, the search system(s) 180 and/or the generative system(s) 190 are first-party system(s), whereas in other implementations, the search system(s) 180 and/or the generative system(s) 190 are third-party system(s). As used herein, the term "first-party" or "first-party entity" refers to an entity that controls, develops, and/or maintains the multimedia content management system 120, whereas the term "third-party" or "third-party entity" refers to an entity that is distinct from the entity that controls, develops, and/or maintains the multimedia content management system 120.

As described in more detail herein (e.g., with respect to FIGS. 2, 3, 4, 5, 6A, 6B, 6C, and 6D), the multimedia content management system 120 can be utilized to generate responses that are responsive to corresponding NL based inputs received at the client device 110. The responses described herein can include, textual content that is responsive to the corresponding NL based inputs, multimedia content that is responsive to the corresponding NL based inputs, or both. The multimedia content described herein can include multimedia content items, such as images, video clips, audio clips, gifs, and/or any other multimedia content that is suitable for being rendered at the client device 110. In implementations where the multimedia media content is obtained using the search system(s) 180, the multimedia content can be considered "non-generative multimedia content". Put another way, the non-generative multimedia content described herein can include existing multimedia content that is capable of being retrieved via the search system(s) 180. In implementations where the multimedia content is obtained using the generative system(s) 180, the multimedia content can be considered "generative multimedia content". Put another way, the generative multimedia content described herein can include multimedia content that is generated (e.g., "on-the-fly" or "in real-time") by the generative system(s) 190 and in response to receiving a prompt for the generative multimedia content from the multimedia content management system 120. Unless explicitly noted otherwise, the non-generative multimedia content and the generative multimedia content is collectively referred to herein as "multimedia content".

Notably, and prior to receiving any NL based inputs from the user of the client device 110, an LLM (e.g., that is stored in the LLM(s) database 140A and that is subsequently utilized by the conversational LLM engine 142 in generating responses to corresponding NL based inputs received from the user of the client device), can be fine-tuned to obtain the multimedia content. In these implementations, the training instance engine 131 can obtain a plurality of training instances to be utilized in fine-tuning the LLM. For example, to enable the LLM to obtain non-generative multimedia content, one or more of the plurality of training instances can include: (1) a corresponding NL based input; and (2) corresponding multimedia content tag(s) indicative of corresponding multimedia content item(s) that are responsive to the corresponding NL based input. These training instances can also include corresponding textual content that is interleaved with respect to the corresponding multimedia content tag(s) to further enable the LLM to logically arrange the non-generative multimedia content with respect to the textual content. As another example, to enable the LLM to obtain generative multimedia content, one or more of the plurality of training instances can include: (1) a corresponding NL based input; and (2) corresponding generative multimedia content prompt(s) indicative of corresponding generative multimedia content item(s) that are responsive to the corresponding NL based input. Similarly, these training instances can also include corresponding textual content that is interleaved with respect to the corresponding generative multimedia content prompt(s) to further enable the LLM to logically arrange the generative multimedia content with respect to the textual content.

In some versions of these implementations, one or more of the plurality of training instances can be curated by, for example, a developer that is associated with the multimedia content management system 120. For instance, the corresponding NL based input and any corresponding textual content of the responses can be obtained from conversation logs, and the developer can manually add the corresponding multimedia content tag(s) and/or the corresponding generative multimedia content prompt(s). In additional or alternative implementations, one or more of the plurality of training instances can be generated using an automated process. For instance, the corresponding NL based input and any corresponding textual content of the multi-modal response can be obtained from conversation logs, and the corresponding multimedia content tag(s) and/or the corresponding generative multimedia content prompt(s) can be automatically inserted into the training instances. Upon being obtained and/or generated, the training instance engine 131 can store the plurality of training instances in the training instance(s) database 130A.

Notably, the corresponding generative multimedia content prompt(s) that are included in each of the training instances may be more detailed than the corresponding multimedia content tag(s) included in each of the additional training instances. This subsequently enables the LLM to generate detailed prompts related to various concepts included in the NL based inputs of the training instances. For instance, if the NL based input for a given training instance is "I'm planning a trip to Rome next summer, what are the must-see attractions?", then the corresponding textual content can include information about "The Colosseum in Rome" followed by a multimedia content tag of "{tag: [image of The Colosseum in Rome] image {url: . . . }}" and followed by additional corresponding textual content that is responsive to the NL based input. Notably, the multimedia content tag does not include a lot of detail since typical search system(s) (e.g., an image search system of the search system(s) 180) can easily obtain an image of "The Colosseum in Rome" by performing a simple image search using the terms "The Colosseum in Rome" for an image query. In contrast, if the NL based input for a given training instance is "narrate a Kentucky Derby race with Mohammed Ali as the winning jockey riding Secretariat as he uses a Louisville Slugger as a riding crop, and include pictures or a video of the race", then the corresponding textual content can include a fictitious story about how Mohammed Ali prepared as a jockey for the Kentucky Derby through a rigorous training regimen with Secretariat followed by a generative multimedia content prompt of "{prompt: [generate an image of Mohammad Ali breezing Secretariat with the Twin Spires of Churchill Downs in the background during the month of May] image generator {url: . . . }}" and followed by additional corresponding textual content that is responsive to the NL based input. Notably, the generative multimedia content prompt does include a lot of detail since typical generative system(s) (e.g., an image generative of the generative system(s) 190) typical require more information that typical search system(s) to accurately reflect a scenario included in an NL based input.

Further, the training engine 132 can obtain a given training instance, from the training instance(s) database 130A, and cause the LLM to process the given training instance. Notably, since the given training instance includes the corresponding multimedia content tag(s) the corresponding generative multimedia content prompt(s), and/or the textual content, the LLM is effectively fine-tuned to perform a specific task of determining when to include multimedia content in the responses and where to include multimedia content in the responses. The training engine 132 can continue fine-tuning the LLM in this manner until one or more conditions are satisfied. The one or more conditions can include, for example, whether the LLM has been fine-tuned based on a threshold quantity of training instances, whether a threshold duration of time has passed since the fine-tuning process began, whether performance of the LLM has achieved a threshold level of performance, and/or other conditions. The training engine 132 can then cause the LLM to be deployed for utilization in generating responses that are responsive to NL based inputs that are received from the user of the client device 110 (e.g., as described with respect to FIGS. 3, 4, and 5). Additional description of the LLM engine 140, the textual content engine 150, the multimedia content engine 160, and the response modification engine 170 are described herein (e.g., with respect to FIGS. 2, 3, 4, 5, 6A, 6B, 6C, and 6D).

Notably, by fine-tuning the LLM in this manner, the multimedia content management system 120 is effectively capable of causing any multimedia content to be obtained (e.g., via the search system(s) 180) and/or generated (e.g., via the generative system(s) 190). Put another way, the multimedia content that can be obtained and/or generated by the multimedia content management system 120 is virtually limitless. However, some multimedia content that is capable of being obtained and/or generated by the multimedia content management system 120 should not be rendered at the client device 110 of the user. For instance, some multimedia content described herein may compromise data security of the user or other users, be utilized in furtherance of nefarious activity, and/or otherwise not be suitable for being rendered at the client device 110. Accordingly, the multimedia content management system 120 described herein is provided to manage the multimedia content that is rendered at the client device 110 to ensure data security of the user and other users is maintained, to mitigate and/or eliminate occurrences of nefarious activity, and to provide other technical advantages. For instance, the multimedia content management system 120 can, in various implementations, achieve the above mentioned technical advantages in a so-called "one-shot" approach by using parallel processing, thereby reducing latency in causing responses to be rendered at the client device. These and other technical advantages are described in more detail herein (e.g., with respect to FIGS. 2, 3, 4, 5, 6A, and 6B).

Figure 2:
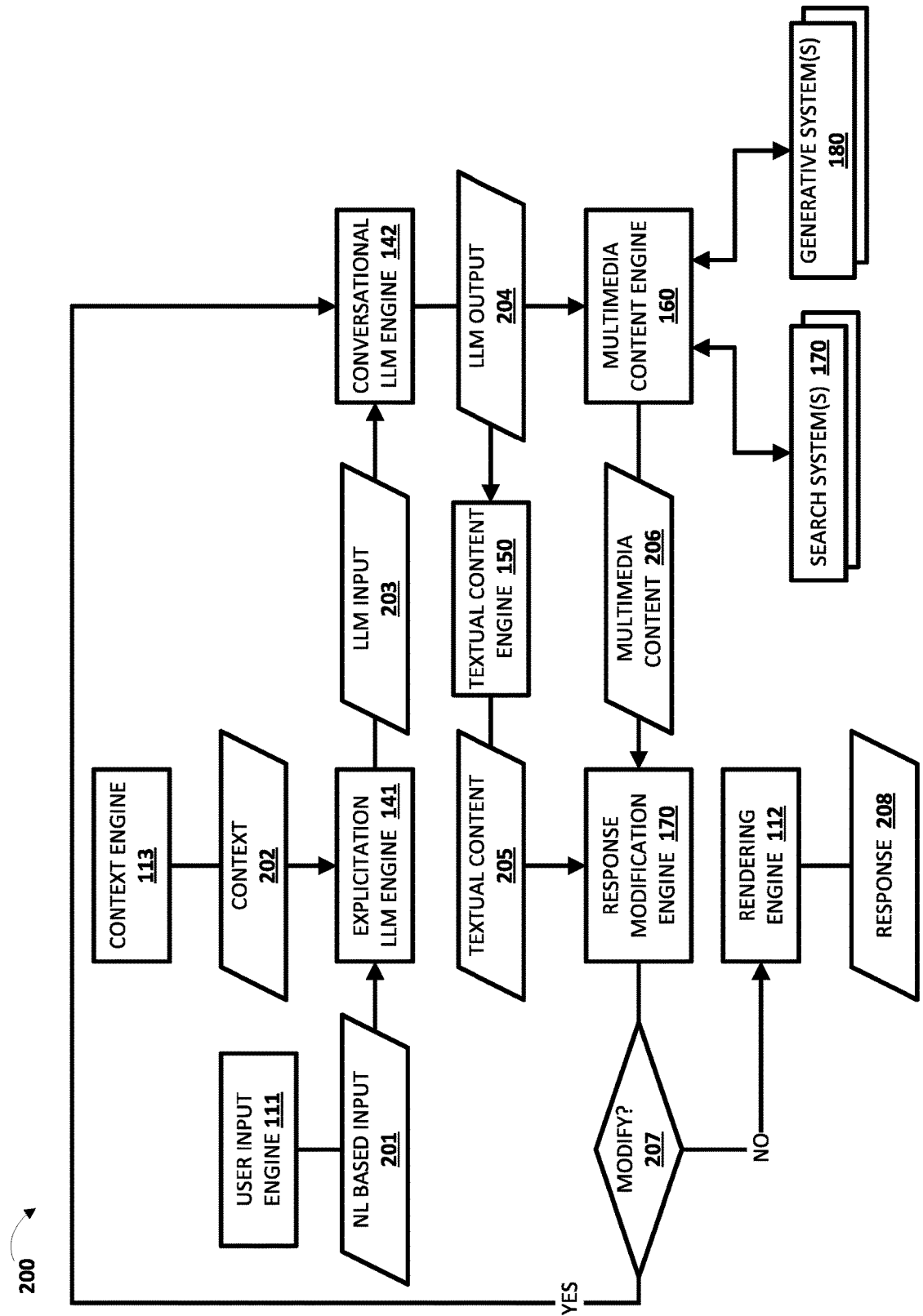
FIG. 2 depicts an example process flow of managing multimedia content obtained by large language model(s) (LLM(s)) using various components from FIG. 1, in accordance with various implementations.

Turning now to FIG. 2, an example process flow 200 of managing multimedia content obtained by large language model(s) (LLM(s)) using various components from FIG. 1 is depicted. For the sake of example, assume that the user input engine 111 of the client device detects NL based input 201. For instance, assume that the NL based input 201 is a prompt of "show me an image of a nerdy attorney". Although the process flow 200 of FIG. 2 is described with respect to the NL based input 201 being explicit NL based input, it should be understood that is for the sake of example and is not meant to be limiting. For instance, the NL based input 201 can additionally, or alternatively, be implied NL based input (e.g., as described with respect to the implied input engine 114).

Further assume that the NL based input 201 is provided to the explicitation LLM engine 141. The explicitation LLM 141 can be one form of an LLM that processes the NL based input 201 (and optionally content 202 determined by the content engine 113 of the client device) to generate LLM input 203. The LLM input 203 can then be provided to the conversational LLM engine 142 to generate LLM output 204. Put another way, the explicitation LLM 141 can process the raw NL based input 201 and put it in a structured form that is more suitable for processing by the conversational LLM engine 142. The explicitation LLM and/or the conversational LLM utilized by these respective engines can include, for example, any LLM that is stored in the LLM(s) database 140A, such as PaLM, BARD, BERT, LaMDA, Meena, GPT, and/or any other LLM, such as any other LLM that is encoder-only based, decoder-only based, sequence-to-sequence based and that optionally includes an attention mechanism or other memory, and that is fine-tuned to generate multimedia content tags as described herein (e.g., with respect to FIG. 3). Notably, in generating the LLM input 203, the explicitation engine 141 can also process a prompt that indicates the raw NL based input 201 (and optionally the context 202) should be put in the structured form that is more suitable for processing by the conversational LLM engine 142.

In some implementations, the explicitation LLM engine 141 can generate one or more queries based on the NL based input 201, and submit the query to one or more search systems (e.g., the search system(s) 180), and process the search result document(s) in generating the LLM input 203. Continuing with the above example, the explicitation LLM engine 141 can generate and submit a first query of "nerdy attorney" to obtain search results indicating that the nerdiest type of attorney is a patent attorney given the underlying scientific background required to become a patent attorney. Accordingly, not only can this information be included in the LLM input 203 for use in subsequently determining textual content for a response, but it can be included in the LLM input 203 for use in subsequently determining multimedia content to be included along with the response.

Further, in generating the LLM output 204, the conversational LLM engine 142 can generate the LLM output 204 as, for example, a probability distribution over a sequence of tokens, such as words, phrases, or other semantic units that are predicted to be responsive to the NL based input 201, non-generative multimedia content tags for use in obtaining non-generative multimedia content that is predicted to be responsive to the NL based input 201, and/or generative multimedia content prompts for use in obtaining generative multimedia content that is predicted to be responsive to the NL based input 201. As noted above, the LLM can include millions or billions of weights and/or parameters that are learned through training the LLM on enormous amounts of diverse data. This enables the LLM to generate the LLM output as the probability distribution over the sequence of tokens. Further, the LLM can be fine-tuned (e.g., as described with respect to FIG. 1) to enable the LLM to generate the LLM output including the sequence of tokens over the non-generative multimedia content tags and/or the generative multimedia content prompts.

Further assume that the LLM output 204 is provided to both the textual content engine 150 and the multimedia content engine 160. In this instance, the textual content engine 150 can determine, based on the probability distribution over the sequence of tokens (e.g., over the words, phrases, or other semantic units), textual content 205 (if any) that is to be included in a response 208 that is responsive to the NL based input. Continuing with the above example where the NL based input 201 is the prompt of "show me an image of a nerdy attorney", the textual content 205 can include "sure, here is an image of a patent attorney, the nerdiest type of attorney there is" and/or other textual content.

Also, in this instance, the multimedia content engine 160 can determine, based on the probability distribution over the sequence of tokens (e.g., over the non-generative multimedia content tags and/or the generative multimedia content prompts), multimedia content 206 that is to be included in the response 208 that is responsive to the NL based input 201. As noted above, the conversational LLM utilized by the conversational LLM engine 142 to generate the LLM output 204 can be fine-tuned to generate non-generative multimedia content tags and/or generative multimedia content prompts (e.g., as described with respect to FIG. 1). The multimedia content tag engine 161 can parse the LLM output 204 itself and/or the textual content 205 to identify any non-generative multimedia content tags. Further, the generative multimedia content prompt engine 162 can parse the LLM output 204 itself and/or the textual content 205 to identify any generative multimedia content prompts. Continuing with the above example where the NL based input 201 is the prompt of "show me an image of a nerdy attorney", the LLM output 204 itself and/or the textual content 205 may include a non-generative multimedia content tag (e.g., {tag: [Image of a patent attorney] image {url: . . . }}) since there are plenty of images that are readily available that depict patent attorneys (e.g., via the search system(s) 180). Additionally, or alternatively, the LLM output 204 itself and/or the textual content 205 may include a generative multimedia content prompt (e.g., {prompt: [patent attorney; nerdy; drafting patent application] image generator {url: . . . }}) to be submitted to a generative model (e.g., an image generator) to generate a generative image of a patent attorney.

Notably, in the LLM output 204 itself and/or in the textual content 205, the non-generative multimedia content tag and/or generative multimedia content prompt may be interleaved with respect to the textual content 205. However, it should be noted that the non-generative multimedia content tag and/or the generative multimedia content prompt may not be included in the response 208 that is rendered for presentation to the user that provided the NL based input 201. Rather, the non-generative multimedia content tag and/or generative multimedia content prompt are replaced (or supplanted) with the multimedia content 206 corresponding to non-generative multimedia item(s) that are obtained based on the non-generative multimedia content tag (e.g., via the search system(s) 180) and/or generative multimedia content item(s) that are generated based on the generative multimedia content prompt (e.g., via the generative system(s) 190).

In implementations where the LLM output 204 itself and/or in the textual content 205 includes the non-generative multimedia content tag, the multimedia content engine 160 can determine a type of the search system(s) 180 to be utilized in obtaining the non-generative multimedia content item(s), such as an image search system (e.g., based on the inclusion of "image" in the non-generative multimedia content tag {tag: [Image of a patent attorney] image {url: . . . }}). However, it should be understood that other search system(s) are contemplated herein (e.g., video search system(s), audio search system(s), gif search system(s), and so on). Further, in implementations where the LLM output 204 itself and/or in the textual content 205 includes the generative multimedia content prompt, the generative multimedia content model selection engine 163 may utilize the generative multimedia content prompt to select, from among a plurality of disparate generative multimedia content models, a given generative multimedia content model to process the generative multimedia content prompt. As noted above with respect to FIG. 1, the plurality of disparate generative multimedia content prompts can include first-party generative multimedia content models and/or third-party generative multimedia content models. Further, the plurality of disparate generative multimedia content prompts can include image generator(s), video generator(s), audio generator(s), and/or any other generative models capable of processing a prompt to generate generative multimedia content.

While the generative multimedia content prompt may include an indication of a type of generative model to be utilized in generating the generative multimedia content item(s) (e.g., based on the inclusion of "image generator" in the generative multimedia content prompt {prompt: [patent attorney; nerdy; drafting patent application] image generator {url: . . . }}), there may be multiple image generator models that are capable of generating the generative image. For instance, the plurality of disparate generative multimedia content prompts can include image generators, video generators, audio generators, and/or other generative models of varying sizes (e.g., generative models including billions of parameters (e.g., 100 billion parameters, 250 billion parameters, 500 billion parameters, etc.) or millions of parameters (e.g., 100 million parameters, 250 million parameters, 500 million parameters, etc.)). In particular, the generative multimedia content model selection engine 163 may utilize a type of the generative multimedia content to be generated (e.g., as indicated by the generative multimedia content prompts) to select the given generative multimedia content model to process the generative multimedia content prompt, and also take into consideration different sizes of the model to reduce computational resource consumption in the human-to-machine interaction.

In implementations where the LLM output 204 itself and/or in the textual content 205 includes the non-generative multimedia content tag, the multimedia content retrieval engine 164 can determine a multimedia content query based on the non-generative multimedia content tag and submit the multimedia content query to a multimedia content search system (e.g., to one or more of the search system(s) 180 and over one or more of the networks 199). In response to the multimedia content query being submitted, the multimedia content retrieval engine 164 can receive the non-generative multimedia content item as the multimedia content 206 that is to be included in the response 208. Further, in implementations where the LLM output 204 itself and/or in the textual content 205 includes the generative multimedia content prompt, the multimedia content retrieval engine 164 can cause the non-generative multimedia content tag to be submitted to the given generative multimedia content model (e.g., via the generative system(s) 190 and over one or more of the networks 199). In response to the generative multimedia content prompt being submitted to the given generative multimedia content model, the multimedia content retrieval engine 164 can receive the generative multimedia content item as the multimedia content 206 that is to be included in the response 208.

In various implementations, and prior to the rendering engine 112 rendering the response 208, the multimedia content management system 120 can determine whether the response 208 should be rendered or whether the response 208 should be modified before it is rendered (e.g., as indicated by 207). In some versions of these implementations, the evaluation engine 171 can process, using an evaluation model stored in the evaluation model(s) database 170A, the NL based input 201, and the textual content 205 (if any) and/or the multimedia content 206 to generate evaluation output. Further, the evaluation engine 171 can determine, based on the evaluation output, whether the response 208 should be rendered or whether the response 208 should be modified before it is rendered (. In response to determining that the response 208 should be rendered, the rendering engine 112 can cause the response 208 to be rendered. However, in response to determining that the response should not be rendered, the response 208 may be modified before anything is rendered for presentation to the user that provided the NL based input 201.

The evaluation model stored in the evaluation model(s) database 170A can include, for example, a visual language model (VLM) or other machine learning (ML) model(s). In implementations where the evaluation model corresponds to a VLM, the evaluation engine 171 can process, using the VLM, the NL based input 201, and the textual content 205 (if any) and/or the multimedia content 206 to generate VLM output as the evaluation output. Further, the evaluation engine 171 can determine, based on the VLM output, whether the response 208 should be rendered. Notably, in processing the NL based input 201, and the textual content 205 (if any) and/or the multimedia content 206 to generate the VLM output, the evaluation engine 171 can further cause the VLM to process a prompt includes a request for the VLM to determine whether the response 208 should be rendered at the client device 110 and given the NL based input 201. Not only can the VLM output include an indication of whether the response 208 should be rendered at the client device 110 and given the NL based input 201, but the VLM output can additionally, or alternatively, include a reason for whether the response 208 should be rendered at the client device 110 and given the NL based input 201.

Continuing with the above example where the NL based input 201 is a prompt of "show me an image of a nerdy attorney", further assume that the textual content 205 includes "sure, here is an image of a patent attorney, the nerdiest type of attorney there is" and that the multimedia content 206 includes an image of a patent attorney as described above. In this example, the evaluation engine 171 can process, using the VLM, the prompt of "show me an image of a nerdy attorney", and the textual content 205 includes "sure, here is an image of a patent attorney, the nerdiest type of attorney there is" and/or the multimedia content 206 that includes the image of a patent attorney. Further assume that the VLM processes a prompt of "should the image be rendered given the context of the NL based input and the textual content included in the response?" In this example, further assume that the VLM output indicates that the multimedia content 206 including the image of the patent attorney should not be rendered since the image in combination with the text of the response 208 could be considered objectionable. Further, and assuming that the image is non-generative and includes an actual patent attorney, the image could compromise data security of the actual patent attorney that is depicted in the image.

However, and rather than outputting some canned textual content (e.g., "I'm sorry, I can't provide the requested image"), the evaluation engine 171 can initiate an additional iteration of the processing using the conversational LLM engine 142 to generate additional LLM output 204. Notably, in the additional iteration of the processing using the conversational LLM engine 142, additional LLM output that is processed to generate the additional LLM output can include a portion of the VLM output (e.g., the reason for why the response 208 should be rendered at the client device 110 and given the NL based input 201). Accordingly, in the additional iteration of the processing, any resulting alternative multimedia content that is subsequently obtained for inclusion in the response 208 that is to be rendered at the client device 110 and in response to the NL based input 201 is unlikely to be considered objectionable or compromise data security of any actual patent attorney. For instance, the alternative multimedia content could include a generative image of a patent attorney (i.e., not an actual patent attorney, but a cartoon-like patent attorney). Further, the response modification engine 170 can again determine whether the alternative multimedia content should be included in the response 208 that is rendered. This process can be iteratively repeated for N iterations (where N is a positive integer that may be fixed (e.g., defined by a developer associated with the multimedia content management system 120) or dynamic (e.g., based on one or more of: a token limit for the LLM, a temporal constraint for the LLM, or a computational constraint for the LLM)). If the N iterations are performed and no suitable multimedia content has been identified, the halt processing engine 172 can halt any further processing, and the canned textual content can be provided as the response 208.

Although the above example is described with respect to the evaluation model being utilized being a VLM, it should be understood that is for the sake of example and is not meant to be limiting. For example, in additional or alternative versions of those implementations, the evaluation engine 171 can process, using a captioning model stored in the evaluation model(s) database 170A, the multimedia content 206 to generate one or more corresponding captions for the multimedia content 206. In these implementations, the evaluation engine 171 can cause the LLM to process one or more of the corresponding captions for the multimedia content 206 and the NL based input 201 (and optionally the textual content 205 (if any)) to generate additional LLM output as the evaluation output. Similarly, in processing this content, the LLM can also process a prompt of "should the image be rendered given the context of the NL based input and the textual content included in the response?" In these implementations, not only can the evaluation output include an indication of whether the response 208 should be rendered at the client device 110 and given the NL based input 201, but the evaluation output can additionally, or alternatively, include a reason for whether the response 208 should be rendered at the client device 110 and given the NL based input 201. As another example, in additional or alternative versions of those implementations, the evaluation engine 171 can obtain tags that are stored in association with the multimedia content 206 (e.g., assuming the multimedia content 206 is non-generative multimedia content and that the tags are, in fact, stored in association with the multimedia content 206), and utilize one or more of the tags in lieu of the one or more corresponding captions to generate the evaluation output.

Further, although the above examples are described with respect to non-generative content capable of being obtained from the search system(s), it should be understood that is also for the sake of example and is not meant to be limiting. In additional or alternative implementations, non-generative multimedia content items can be obtained from the curated multimedia content database 160A. In these implementations, the multimedia content retrieval engine 163 can submit the multimedia search queries over the curated multimedia content database 160A if an entity identified in the multimedia content tag is a particular type of entity that, for example, may be considered sensitive, personal, controversial, etc. For instance, if the multimedia content tag indicates that an image of the President of the United States should be included in the response 208, then an official presidential headshot from the curated multimedia content database 160A can be obtained as the multimedia content 206. However, it should be understood that whether the LLM output 204 itself and/or the textual content 205 includes the multimedia content tags (rather than the generative multimedia content prompts described above) may be dependent on the NL based input 201 provided by the user, and/or the LLM output 204 and/or the textual content 205 generated by the LLM.

Figure 3:
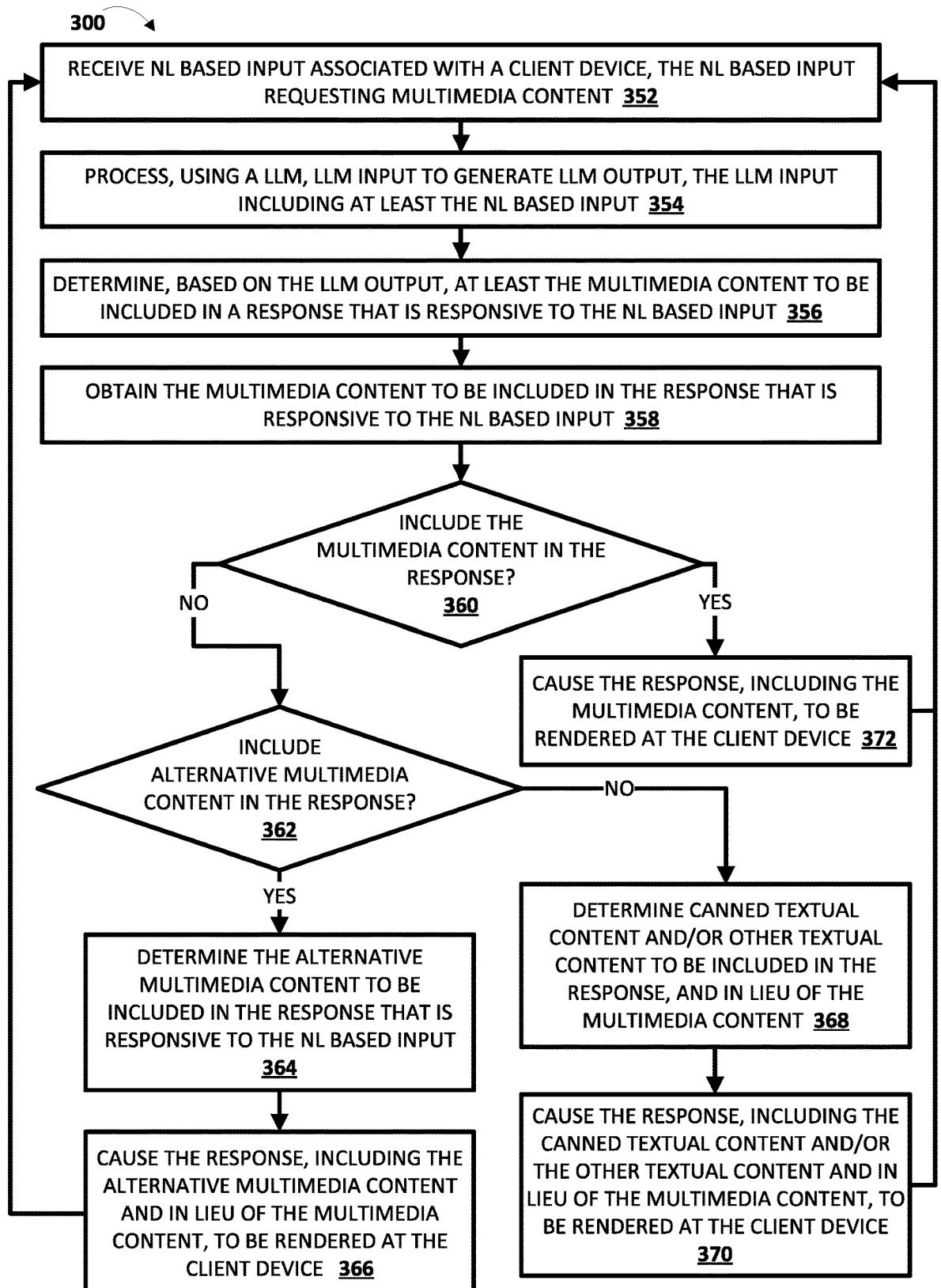
FIG. 3 depicts a flowchart illustrating an example method of managing multimedia content obtained by large language model(s) (LLM(s)), in accordance with various implementations.

Turning now to FIG. 3, a flowchart illustrating an example method 300 of managing multimedia content obtained by large language model(s) (LLM(s)) is depicted. For convenience, the operations of the method 300 are described with reference to a system that performs the operations. This system of the method 300 includes one or more processors, memory, and/or other component(s) of computing device(s) (e.g., client device 110 of FIG. 1, multi-modal response system 120 of FIG. 1, computing device 710 of FIG. 7, one or more servers, and/or other computing devices). Moreover, while operations of the method 300 are shown in a particular order, this is not meant to be limiting. One or more operations may be reordered, omitted, and/or added.

At block 352, the system receives natural language (NL) based input associated with a client device, the NL based input requesting multimedia content. For example, the NL based input can be detected via a user input engine of the client device (e.g., via the user input engine 111) and provided to the system via the client device. In some implementations, the multimedia content may be explicitly requested by the NL based input (e.g., "include pictures", "include video", or the like). In other implementations, the multimedia content may be implicitly requested by the NL based input (e.g., based on a determined intent or context associated with a user that provided the NL based input).

At block 354, the system processes, using a large language model (LLM), LLM input to generate LLM output, the LLM input including at least the NL based input. In some implementations, the LLM input can be generated using an explicitation LLM (e.g., via the explicitation LLM engine 141) that structures the NL based input and/or other content (e.g., context, other prompts that are in addition to the NL based input, etc.) for processing by the LLM. In additional or alternative implementations, the LLM input can be the raw NL based input that is received by the system. Further, in some implementations, the LLM output can be generated using a conversational LLM (e.g., via the conversational LLM engine 142) that is fine-tuned as described herein (e.g., with respect to the fine-tuning engine 130).

At block 356, the system determines, based on the LLM output, at least the multimedia content to be included in a response that is responsive to the NL based input. Notably, the LLM that is fine-tuned as described herein is capable of generating corresponding multimedia content tag(s) (e.g., to be submitted to search system(s) 180) and/or corresponding generative multimedia content prompt(s) (e.g., to be submitted to generative system(s) 190) to be utilized in obtaining the multimedia content. Accordingly, the system can determine the multimedia content to be included in the response that is responsive to the NL based input based on the corresponding multimedia content tag(s) (e.g., based on the multimedia content tag engine 161 parsing the LLM output to identify the corresponding multimedia content tag(s)) and/or the corresponding generative multimedia content prompt(s) (e.g., based on the generative multimedia content prompt engine 162 parsing the LLM output to identify the corresponding generative multimedia content prompt(s)). Additionally, or alternatively, the system can determine, based on the LLM output, textual content to be included in the response that is responsive to the NL based input and that is to be included in the response along with the multimedia content (e.g., via the textual content engine 160). However, it should be noted that some responses may include multimedia content without any textual content.

At block 358, the system obtains the multimedia content to be included in the response that is responsive to the NL based input. For example, in implementations where the multimedia content to be included in the response includes non-generative multimedia content, the corresponding multimedia content tag(s) can be utilized to determine one or more non-generative multimedia content queries (e.g., via the multimedia content tag engine 161), and the non-generative multimedia content can be obtained based on the one or more non-generative multimedia content queries (e.g., via the multimedia content retrieval engine 164 submitting the one or more non-generative multimedia content queries to the search system(s) 180). As another example, in implementations where the multimedia content to be included in the response includes generative multimedia content, the corresponding generative multimedia content prompt(s) can be utilized to determine one or more generative multimedia content prompts (e.g., via the generative multimedia content prompt engine 162), one or more generative system(s) can be selected for processing the one or more generative multimedia content prompts (e.g., via the generative multimedia content model selection engine 163), and the generative multimedia content can be obtained based on the one or more generative multimedia content prompts (e.g., via the multimedia content retrieval engine 164 submitting the one or more generative multimedia content prompts to the generative system(s) 190).

At block 360, the system determines whether to include the multimedia content in the response to be rendered at the client device. The system can determine whether to include the multimedia content in the response to be rendered at the client device based on, for example, evaluation output generated using one or more evaluation model(s) (e.g., via the evaluation engine 171 and as described above with respect to FIG. 2). Put another way, even if the system is capable of obtaining the multimedia content, the system can determine whether it is suitable for being included in the response (e.g., based on the evaluation output). If, at an iteration of block 360, the system determines to refrain from including the multimedia content in the response to be rendered at the client device, the system proceeds to block 362.

At block 362, the system determines whether to include alternative multimedia content in the response to be rendered at the client device. Put another way, even if the system determines that the multimedia content that is initially obtained is not suitable for being included in the response, the system can attempt to obtain alternative multimedia content that is suitable for being included in the response (e.g., based on subsequent evaluation of the alternative multimedia content by the evaluation engine 171). In some implementations, the system may be configured (e.g., by a developer associated with the multimedia content management system 120) to attempt to obtain the alternative multimedia content for N iterations to obtain the alternative multimedia content that is suitable for being included in the response. Notably, N may be a positive integer that is fixed (e.g., defined by the developer associated with the multimedia content management system 120) or dynamic (e.g., based on one or more of: a token limit for the LLM, a temporal constraint for the LLM, or a computational constraint for the LLM)). In other implementations, the system may not attempt to obtain any alternative multimedia content and the operations of block 362 may be omitted.

If, at an iteration of block 362, the system determines to include alternative multimedia content in the response to be rendered at the client device, then the system proceeds to block 364. At block 364, the system determines the alternative multimedia content to be included in the response that is responsive to the NL based input. In some implementations, the system can determine the alternative multimedia content based on the LLM output that was initially generated and based on at least a portion of the evaluation output that was generated based on processing at least the multimedia content that was initially obtained, and/or based on additional LLM output that is generated based on processing the NL based input and the at least a portion of the evaluation output that was generated based on processing at least the multimedia content that was initially obtained. Notably, the evaluation output can include an indication of whether the multimedia content should be rendered and/or an indication of a reason for why it was determined whether the multimedia content should be rendered. Accordingly, by considering the evaluation output in determining the alternative multimedia content, the system should refrain from determining the alternative multimedia content that should not be rendered for the same reason as the multimedia content that was initially obtained. For instance, in implementations where the alternative multimedia content is determined based on the LLM output that was initially generated and based on at least a portion of the evaluation output that was generated based on processing at least the multimedia content that was initially obtained, the system can modify the one or more multimedia content queries and/or the one or more multimedia content prompts to ensure they do elicit the same multimedia content that was initially obtained. Also, for instance, in implementations where the alternative multimedia content is determined based on the additional LLM output that is generated based on processing the NL based input and the at least a portion of the evaluation output that was generated based on processing at least the multimedia content that was initially obtained, the system can cause the additional LLM output to be generated with the knowledge of reason for why it was determined whether the multimedia content should be rendered, thereby causing different non-generative multimedia content tag(s) and/or generative multimedia content prompt(s) to be included in the additional LLM output.

At block 366, the system causes the response, including the alternative multimedia content and in lieu of the multimedia content, to be rendered at the client device. For example, the system can cause the response to be visually rendered at the client device via a display of the client device. The system returns to block 352 and can perform an additional iteration of the method 300 in response to receiving additional NL based input associated with the client device (or an additional client device) at an additional iteration of block 352.

If, at an iteration of block 362, the system determines not to include alternative multimedia content in the response to be rendered at the client device, then the system proceeds to block 368. At block 368, the system determines canned textual content and/or other textual content to be included in the response, and in lieu of the multimedia content. Put another way, if the system determines that the multimedia content that is initially obtained and/or any alternative multimedia content that is subsequently obtained is not suitable for being included in the response (e.g., based on N iterations not resulting in any alternative multimedia content), the system can halt any further attempts to obtain the multimedia content and determine the canned textual content and/or the other textual content to be included in the response, and in lieu of the multimedia content. The canned textual content can indicate that the multimedia content cannot be rendered and optionally provide a reason (e.g., indicated by the evaluation output) for why the multimedia content cannot be rendered. Further, the other textual content can include textual content that is determined based on the LLM output and/or any additional LLM output that is generated.

At block 370, the system causes the response, including the canned textual content and/or the other textual content and in lieu of the multimedia content, to be rendered at the client device. For example, the system can cause the response to be visually rendered at the client device via a display of the client device. The system returns to block 352 and can perform an additional iteration of the method 300 in response to receiving additional NL based input associated with the client device (or an additional client device) at an additional iteration of block 352.

If, at an iteration of block 360, the system determines to include the multimedia content in the response to be rendered at the client device, the system proceeds to block 372. At block 372, the system causes the response, including the multimedia content to be rendered at the client device. For example, the system can cause the response to be visually rendered at the client device via a display of the client device. The system returns to block 352 and can perform an additional iteration of the method 300 in response to receiving additional NL based input associated with the client device (or an additional client device) at an additional iteration of block 352.

Figure 4:
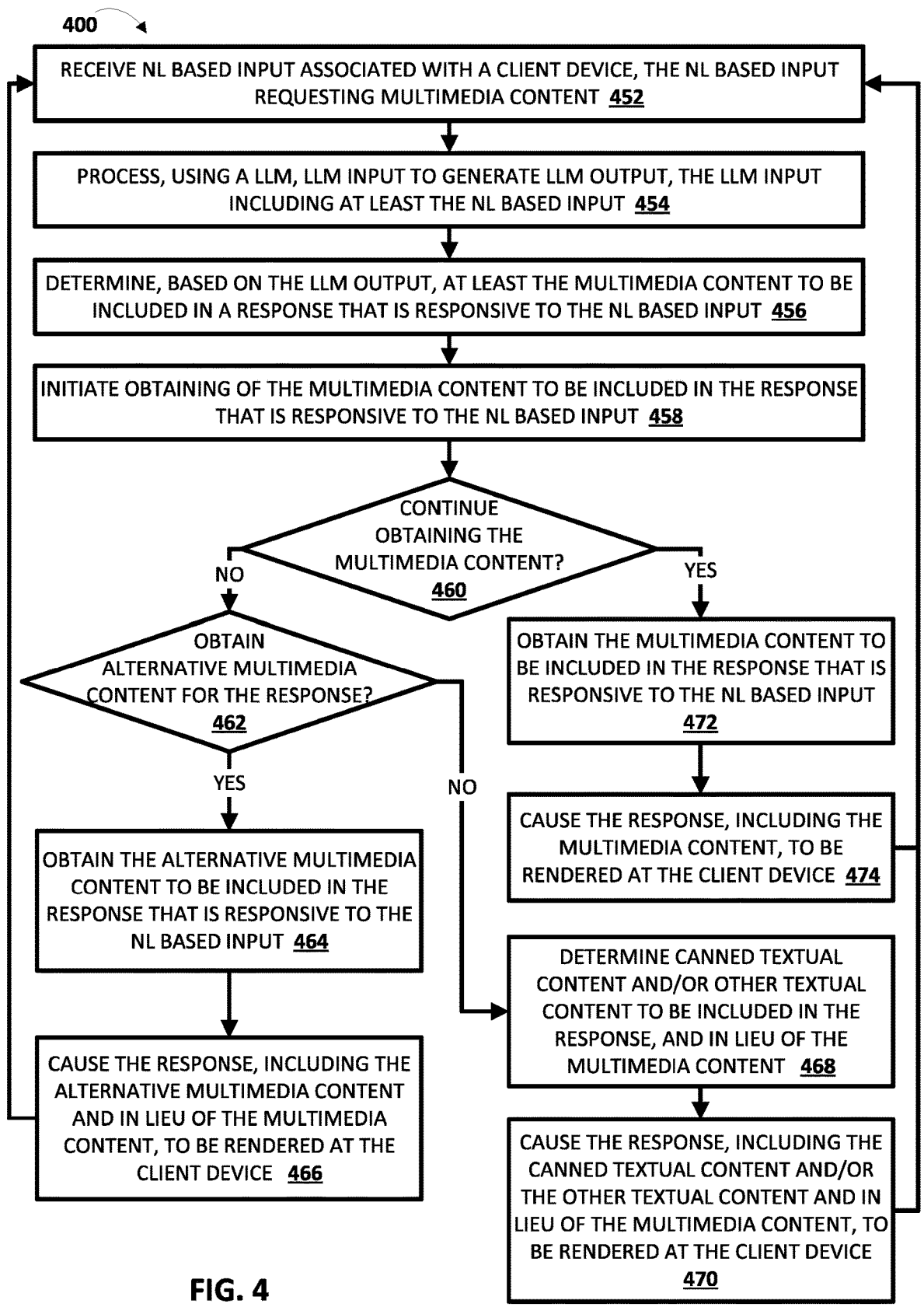
FIG. 4 depicts a flowchart illustrating another example method of managing multimedia content obtained by large language model(s) (LLM(s)), in accordance with various implementations.

Turning now to FIG. 4, a flowchart illustrating another example method 400 of managing multimedia content obtained by large language model(s) (LLM(s)) is depicted. For convenience, the operations of the method 400 are described with reference to a system that performs the operations. This system of the method 400 includes one or more processors, memory, and/or other component(s) of computing device(s) (e.g., client device 110 of FIG. 1, multi-modal response system 120 of FIG. 1, computing device 710 of FIG. 7, one or more servers, and/or other computing devices). Moreover, while operations of the method 400 are shown in a particular order, this is not meant to be limiting. One or more operations may be reordered, omitted, and/or added.

At block 452, the system receives natural language (NL) based input associated with a client device, the NL based input requesting multimedia content. At block 454, the system processes, using a large language model (LLM), LLM input to generate LLM output, the LLM input including at least the NL based input. At block 456, the system determines, based on the LLM output, at least the multimedia content to be included in a response that is responsive to the NL based input. The operations of blocks 452-456 of the method 400 of FIG. 4 can be performed in the same or similar manner described above with respect to blocks 352-356 of the method 300 of FIG. 3, respectively.

At block 458, the system initiates obtaining of the multimedia content to be included in the response that is responsive to the NL based input. For example, in implementations where the multimedia content to be included in the response includes non-generative multimedia content, the corresponding multimedia content tag(s) can be utilized to determine one or more non-generative multimedia content queries (e.g., via the multimedia content tag engine 161), and the system can initiate obtaining the non-generative multimedia content based on the one or more non-generative multimedia content queries (e.g., via the multimedia content retrieval engine 164 submitting the one or more non-generative multimedia content queries to the search system(s) 180). As another example, in implementations where the multimedia content to be included in the response includes generative multimedia content, the corresponding generative multimedia content prompt(s) can be utilized to determine one or more generative multimedia content prompts (e.g., via the generative multimedia content prompt engine 162), one or more generative system(s) can be selected for processing the one or more generative multimedia content prompts (e.g., via the generative multimedia content model selection engine 163), and system can initiate obtaining the generative multimedia content based on the one or more generative multimedia content prompts (e.g., via the multimedia content retrieval engine 164 submitting the one or more generative multimedia content prompts to the generative system(s) 190).

At block 460, the system determines whether to continue obtaining the multimedia content to be included in the response that is responsive to the NL based input. The system can determine whether to continue obtaining the multimedia content to be included in the response that is responsive to the NL based input based on, for example, one or more signals. The one or more signals can include an NL based input context given the NL based input with respect to the multimedia content requested by the NL based input, a multimedia content context given the multimedia content requested by the NL based input with respect to the NL based input, a response context given the multimedia content requested by the NL based input with respect to the textual content, and/or other signals.

In implementations where the one or more signals include the NL based input context given the NL based input with respect to the multimedia content requested by the NL based input, the NL based input context can indicate whether the multimedia content requested by the NL based input should be rendered given the NL based input. For instance, given the NL based input that was directed to the client device, no multimedia content that can be obtained responsive to the NL based input may be suitable for rendering responsive to the NL based input. In implementations where the one or more signals include the multimedia content context given the multimedia content requested by the NL based input with respect to the NL based input, the multimedia content context can indicate whether the multimedia content requested by the NL based input should be rendered given the NL based input. For instance, given the corresponding multimedia content tag(s) and/or the corresponding multimedia content prompt(s) that are included in the LLM output, no multimedia content may be suitable for rendering responsive to the NL based input. In implementations where the one or more signals include the response context given the multimedia content requested by the NL based input with respect to the textual content, the response context can indicate whether the multimedia content requested by the NL based input should be rendered given the NL based input. For instance, given the corresponding multimedia content tag(s) and/or the corresponding multimedia content prompt(s) that are included in the LLM output and with respect to other textual content that is determined for inclusion in the response, no multimedia content may be suitable for rendering responsive to the NL based input.

Notably, and in contrast with the method 300 of FIG. 3 where the system determines whether to include the multimedia content that is already obtained, the system can determine whether to continue obtaining of the multimedia content before it is obtained by the system in the method 400 of FIG. 4. Put another way, the system in the method 400 of FIG. 4 balances latency by initiating the obtaining of the multimedia content, but also computation resource consumption in halting any further steps of obtaining the multimedia content if the one or more signals indicate that any multimedia content that is obtained the corresponding multimedia content tag(s) and/or the corresponding multimedia content prompt(s) should not be rendered at the client device. Accordingly, and rather than utilizing the evaluation model(s) after the multimedia content is obtained, the system in the method 400 of FIG. 4 can cancel any multimedia content query to obtain the multimedia content and/or any processing, by a generative multimedia content model, of a generative multimedia content prompt to generate the multimedia content.

If, at an iteration of block 460, the system determines not to continue obtaining the multimedia content to be included in the response that is responsive to the NL based input, the system proceeds to block 462. At block 462, the system determines whether to obtain alternative multimedia content for the response. Although the system may determine not to continue obtaining the multimedia content based on the one or more signals, the system may still attempt to obtain alternative multimedia content if the one or more signals indicate that alternative multimedia content exists that is suitable for being rendered at the client device.

If, at an iteration of block 462, the system determines to obtain the alternative multimedia content for the response, then the system proceeds to block 464. At block 464, the system obtains the alternative multimedia content to be included in the response that is responsive to the NL based input. The alternative multimedia content can be obtained in the same or similar manner described with respect to the operations of block 364 of the method 300 of FIG. 3. However, in obtaining the alternative multimedia content, the system may perform another iteration of the method 400 of FIG. 4 starting at block 460 to determine whether to continue obtaining the alternative multimedia content.

At block 466, and assuming that the system determined to obtain the alternative multimedia content, the system causes the response, including the alternative multimedia content and in lieu of the multimedia content, to be rendered at the client device. For example, the system can cause the response to be visually rendered at the client device via a display of the client device. The system returns to block 452 and can perform an additional iteration of the method 400 in response to receiving additional NL based input associated with the client device (or an additional client device) at an additional iteration of block 452.

If, at an iteration of block 462, the system determines not to obtain the alternative multimedia content for the response, then the system proceeds to block 468. At block 468, the system determines canned textual content and/or other textual content to be included in the response, and in lieu of the multimedia content. At block 470, the system causes the response, including the canned textual content and/or the other textual content and in lieu of the multimedia content, to be rendered at the client device. The operations of blocks 468 and 470 can be performed in the same or similar manner described above with respect to blocks 368 and 370 of the method 300 of FIG. 3, respectively. The system returns to block 452 and can perform an additional iteration of the method 400 in response to receiving additional NL based input associated with the client device (or an additional client device) at an additional iteration of block 452.

If, at an iteration of block 460, the system determines to continue obtaining the multimedia content to be included in the response that is responsive to the NL based input, the system proceeds to block 472. At block 472, the system obtains the multimedia content to be included in the response that is responsive to the NL based input. At block 474, the system causes the response, including the multimedia content, to be rendered at the client device. For example, the system can cause the response to be visually rendered at the client device via a display of the client device. The system returns to block 452 and can perform an additional iteration of the method 400 in response to receiving additional NL based input associated with the client device (or an additional client device) at an additional iteration of block 452.

Although not depicted in the method 400 of FIG. 4 for the sake of brevity, it should be understood that the system can additionally evaluate any multimedia content and/or any alternative multimedia content after it is obtained to determine whether it should be rendered at the client device (e.g., as described with respect to the method 300 of FIG. 3). In these implementations, the system can also determine whether to obtain alternative multimedia content based on the evaluation of any obtained multimedia content.

Figure 5:
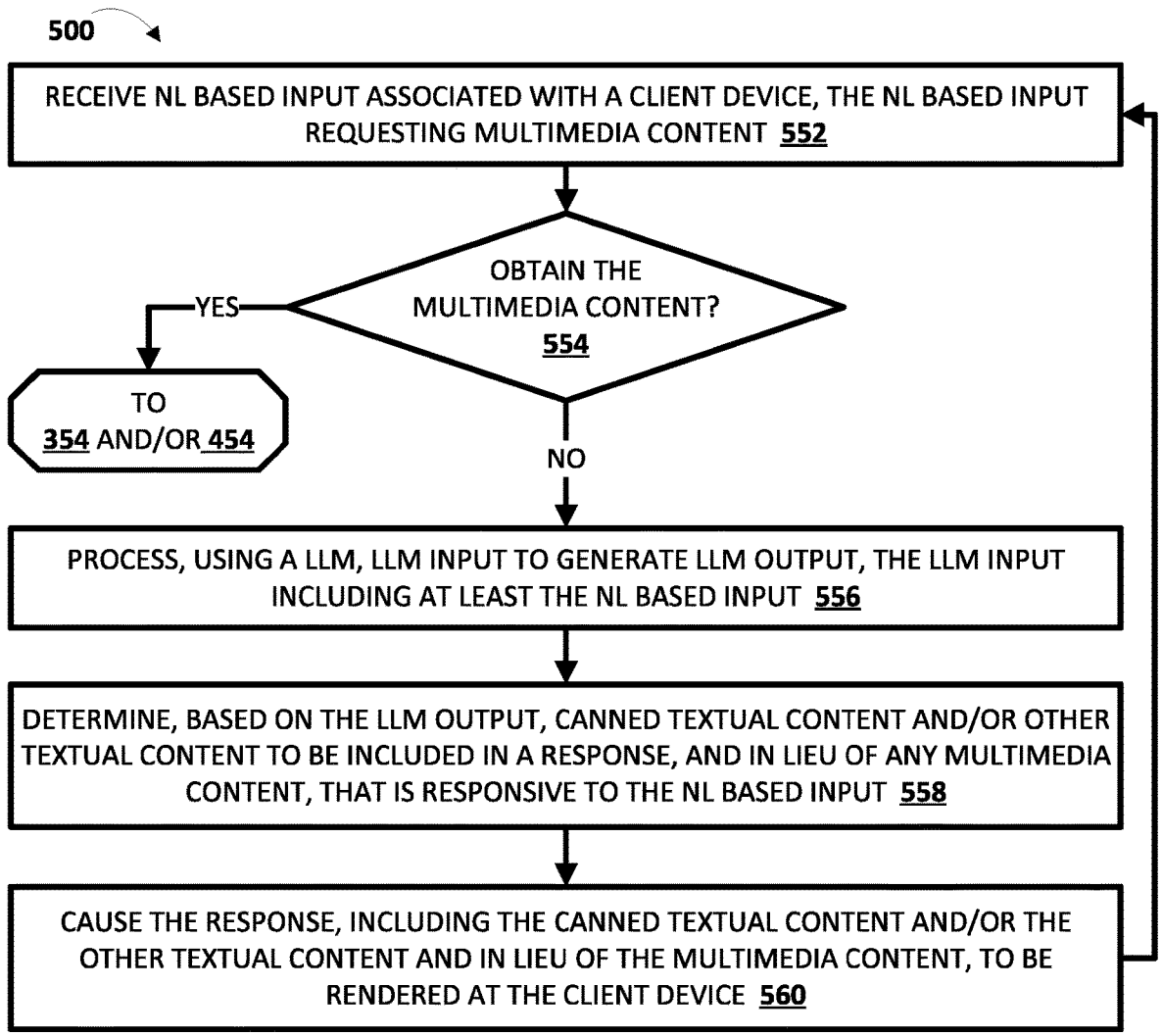
FIG. 5 depicts a flowchart illustrating yet another example method of managing multimedia content obtained by large language model(s) (LLM(s)), in accordance with various implementations.

Turning now to FIG. 5, a flowchart illustrating yet another example method 500 of managing multimedia content obtained by large language model(s) (LLM(s)) is depicted. For convenience, the operations of the method 500 are described with reference to a system that performs the operations. This system of the method 500 includes one or more processors, memory, and/or other component(s) of computing device(s) (e.g., client device 110 of FIG. 1, multi-modal response system 120 of FIG. 1, computing device 710 of FIG. 7, one or more servers, and/or other computing devices). Moreover, while operations of the method 500 are shown in a particular order, this is not meant to be limiting. One or more operations may be reordered, omitted, and/or added.

At block 552, the system receives natural language (NL) based input associated with a client device, the NL based input requesting multimedia content. The operations of block 552 of the method 500 of FIG. 5 can be performed in the same or similar manner described above with respect to block 352 of the method 300 of FIG. 3

At block 554, the system determines whether to obtain the multimedia content based on the NL based input. Notably, and in contrast with the method 300 of FIG. 3 where the system determines whether to include the multimedia content that is already obtained and in contrast with the method 400 of FIG. 4 where the system determines whether to continue obtaining the multimedia content, the system can determine whether to even initiate obtaining of the multimedia content in the method 500 of FIG. 5. Put another way, the system in the method 500 of FIG. 5 can refrain from causing any multimedia content retrieval from being initiated. For instance, one or more terms of the NL based input may request multimedia content that cannot be obtained and/or generated, multimedia content that may have a nefarious purpose, multimedia content that may comprise security and/or privacy of the user and/or other users, and/or satisfy one or more other criteria that causes the system to refrain from causing any multimedia content retrieval from being initiated.

If, at an iteration of block 554, the system determines to obtain the multimedia content based on the NL based input, then the system proceeds to block 354 of the method 300 of FIG. 3 and/or block 454 of the method 400 of FIG. 4. Put another way, and assuming the system determines to obtain the multimedia content based on the NL based input, the system can initiate the method 300 of FIG. 3 and/or the method 400 of FIG. 4 to determine whether to continue obtaining the multimedia content and/or whether any multimedia content that is obtained should be rendered.

If, at an iteration of block 554, the system determines not to obtain the multimedia content based on the NL based input, then the system proceeds to block 556. At block 556, the system processes, using a large language model (LLM), LLM input to generate LLM output, the LLM input including at least the NL based input. The operations of block 556 can be performed in the same or similar manner described with respect to block 354 of the method 300 of FIG. 3. However, the LLM input may additionally include a prompt that indicates no multimedia content should be obtained responsive to the NL based input.

At block 558, the system determines, based on the LLM output, canned textual content and/or other textual content to be included in a response, and in lieu of any multimedia content, that is responsive to the NL based input. At block 560, the system causes the response, including the canned textual content and/or the other textual content and in lieu of the multimedia content, to be rendered at the client device. The operations of blocks 558 and 560 can be performed in the same or similar manner described above with respect to blocks 368 and 370 of the method 300 of FIG. 3, respectively. The system returns to block 552 and can perform an additional iteration of the method 500 in response to receiving additional NL based input associated with the client device (or an additional client device) at an additional iteration of block 552.

Turning now to FIGS. 6A, 6B, 6C, and 6D, various non-limiting examples of managing multimedia content obtained by large language model(s) (LLM(s)) are depicted. The client device 110 (e.g., the client device 110 from FIG. 1) may include various user interface components including, for example, microphone(s) to generate audio data based on spoken utterances and/or other audible input, speaker(s) to audibly render synthesized speech and/or other audible output, and/or a display 112A to visually render visual output. Further, the display 112A of the client device 110 can include various system interface elements 112A1, 112A2, and 112A3 (e.g., hardware and/or software interface elements) that may be interacted with by a user of the client device 110 to cause the client device 110 to perform one or more actions. The display 112A of the client device 110 enables the user to interact with content rendered on the display 112A by touch input (e.g., by directing user input to the display 112A0 or portions thereof (e.g., to a text entry box 112A4, to a keyboard (not depicted), or to other portions of the display 112A)) and/or by spoken input (e.g., by selecting microphone interface element 112A5—or just by speaking without necessarily selecting the microphone interface element 112A5 (i.e., an automated assistant may monitor for one or more terms or phrases, gesture(s) gaze(s), mouth movement(s), lip movement(s), and/or other conditions to activate spoken input) at the client device 110). Although the client device 110 depicted in FIGS. 6A, 6B, 6C, and 6D is a mobile phone, it should be understood that is for the sake of example and is not meant to be limiting. For example, the client device 110 may be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 110.

Figure 6A:
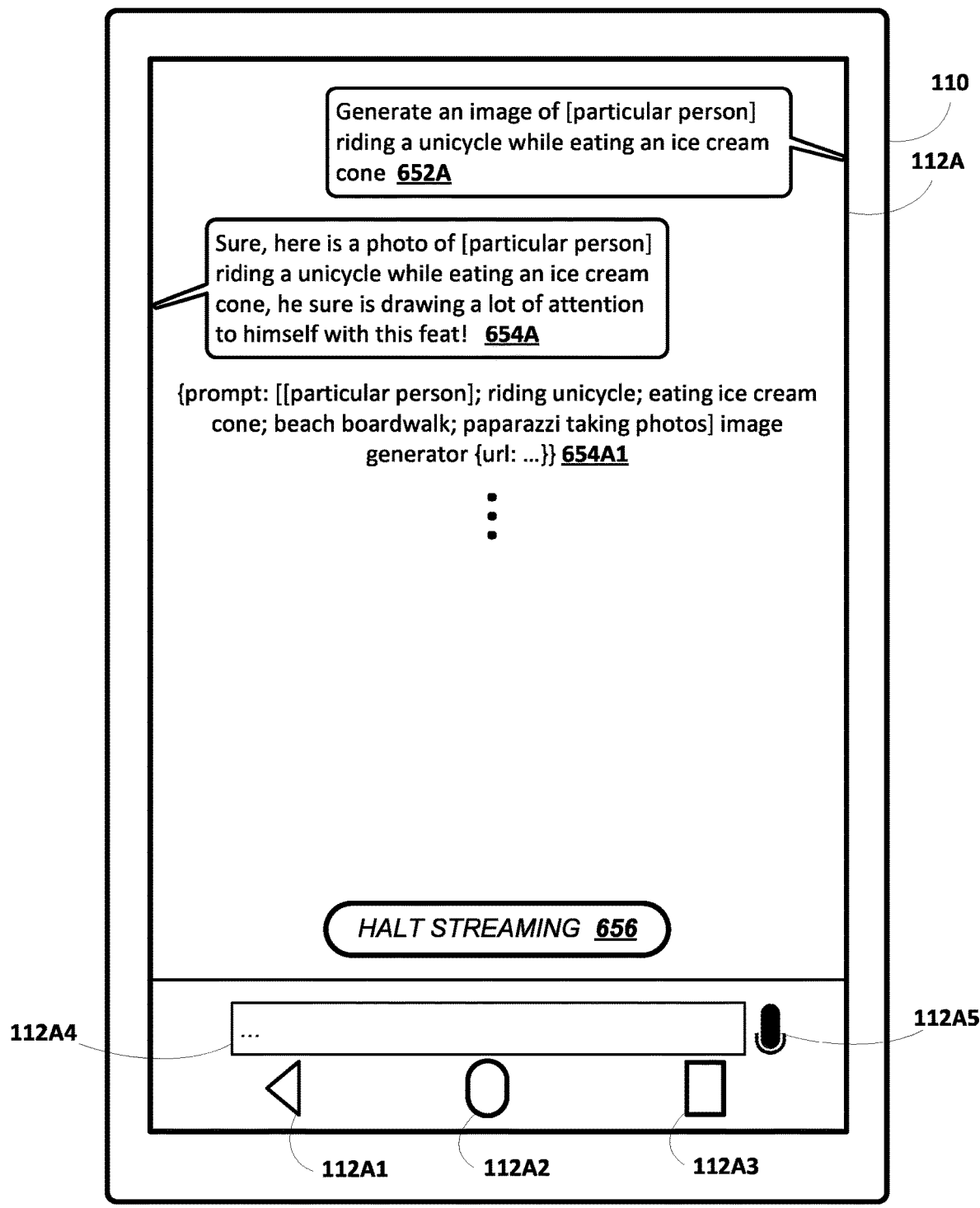
FIG. 6A, FIG. 6B, FIG. 6C, and FIG. 6D depict various non-limiting examples of managing multimedia content obtained by large language model(s) (LLM(s)), in accordance with various implementations.

Referring specifically to FIG. 6A, for the sake of example, assume that a user of the client device 110 provides NL based input 652A of "Generate an image of [particular person] riding a unicycle while eating an ice cream cone". Further assume that a system (e.g., the multimedia content management system 120 from FIG. 1) processes at least the NL based input 652A using an LLM (e.g., that is fine-tuned as described with respect to FIG. 1) to generate LLM output for a response that includes multimedia content (e.g., as described with respect to FIGS. 2-5). For instance, assume that the LLM output for the response includes at least a textual segment 654A that provides an overview of the generative image that is to be rendered as part of the response. Further assume that the LLM output for the response includes at least a generative multimedia content prompt 654A1 that is to be utilized in generating the generative image that is to be rendered as part of the response.

Although the generative multimedia content prompt 654A1 is depicted in the display 112A in FIG. 6A, it should be understood that in various implementations, the generative multimedia content prompt 654A1 may not be not rendered (e.g., visually and/or audibly) for presentation to the user such that they are not perceivable by the user. Rather, the generative multimedia content prompt 654A1 serves as a placeholder for where the generative multimedia content will be inserted into the response once it is obtained (and assuming the system determines that it should be rendered).

Figure 6B:
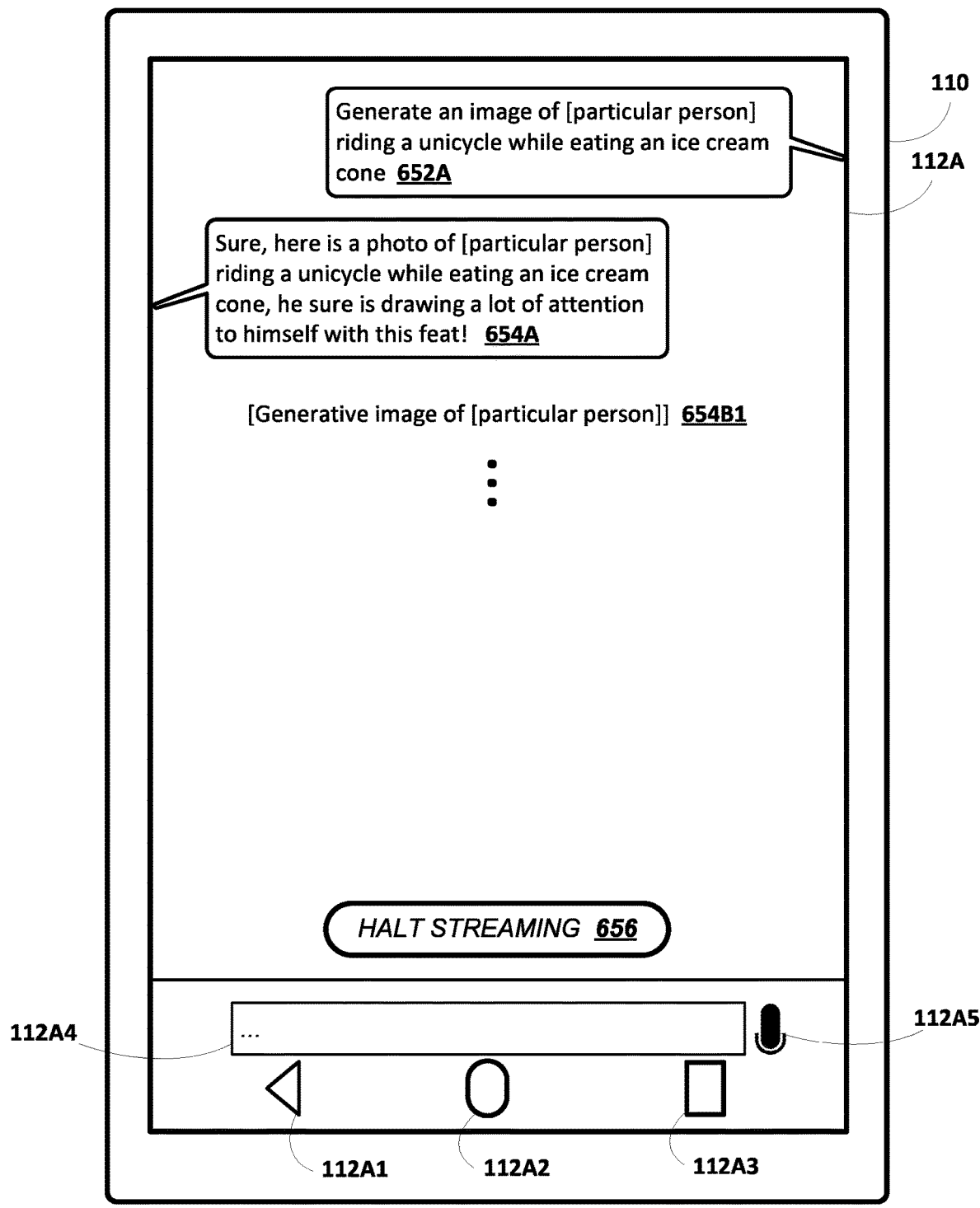

For example, referring specifically to FIG. 6B, and continuing with the above example, the generative multimedia content prompt 554A1 can be replaced with the generative image of the particular person as indicated by 654B1. Notably, the textual segment 654A can be visually and/or audibly rendered for presentation to the user as they are obtained by the client device 110, and prior to the generative multimedia content being obtained. Put another way, the client device 110 can stream the textual segment 654A as it is obtained, but leave space to insert the generative multimedia content as it is obtained. This enables latency in rendering of the response to be reduced. Further, a halt streaming selectable element 656 can be provided and, when selected, any streaming of the response can be halted to further preserve computational resources if the user decides to no longer receive the response.

Further, in some implementations, the generative multimedia content item can be rendered along with an indication of a corresponding source of the generative multimedia content (e.g., a uniform resource locator (URL) or the like). Moreover, in some implementations, the generative multimedia content item (or the indication of the corresponding source) can be selectable and, when selected, can cause the client device 110 to navigate (e.g., via a web browser or other application accessible via the application engine 115) to the corresponding generative model(s) utilized in generating the generative multimedia content item. For instance, if the user selects the image of the particular person, the client device 110 can navigate to the image generator utilized to generate the generative image of the particular person (and optionally be presented with the generative multimedia content prompt 654A1 that was utilized to generate the generative image of the particular person).

Although FIGS. 6A and 6B are described with respect to the multimedia content included in the response being generative multimedia content, it should be understood that is for the sake of example and is not meant to be limiting. In additional or alternative implementations, the multimedia content can include non-generative multimedia content that is obtained via multimedia content tags associated with non-generative multimedia content items. Further, although FIGS. 6A and 6B are described with respect to the multimedia content that is requested in the NL based input 652A being obtained, it should be understood that is also for the sake of example and is not meant to be limiting. Rather, for the sake of example in FIGS. 6A and 6B, it is assumed that the system (e.g., the multimedia content management system 120 from FIG. 1) determines the multimedia content obtained based on the generative multimedia content prompt 654A1 should be rendered at the client device 110. In making this determination the system can utilize various techniques described herein (e.g., with respect to FIGS. 2-5). Put another way, the multimedia content that is requested in the examples of FIGS. 6A and 6B will not compromise data security of the user or other users, compromise data privacy of the user or other users, be utilized for nefarious purposes, and/or should not be rendered for any other reason.

Figure 6C:
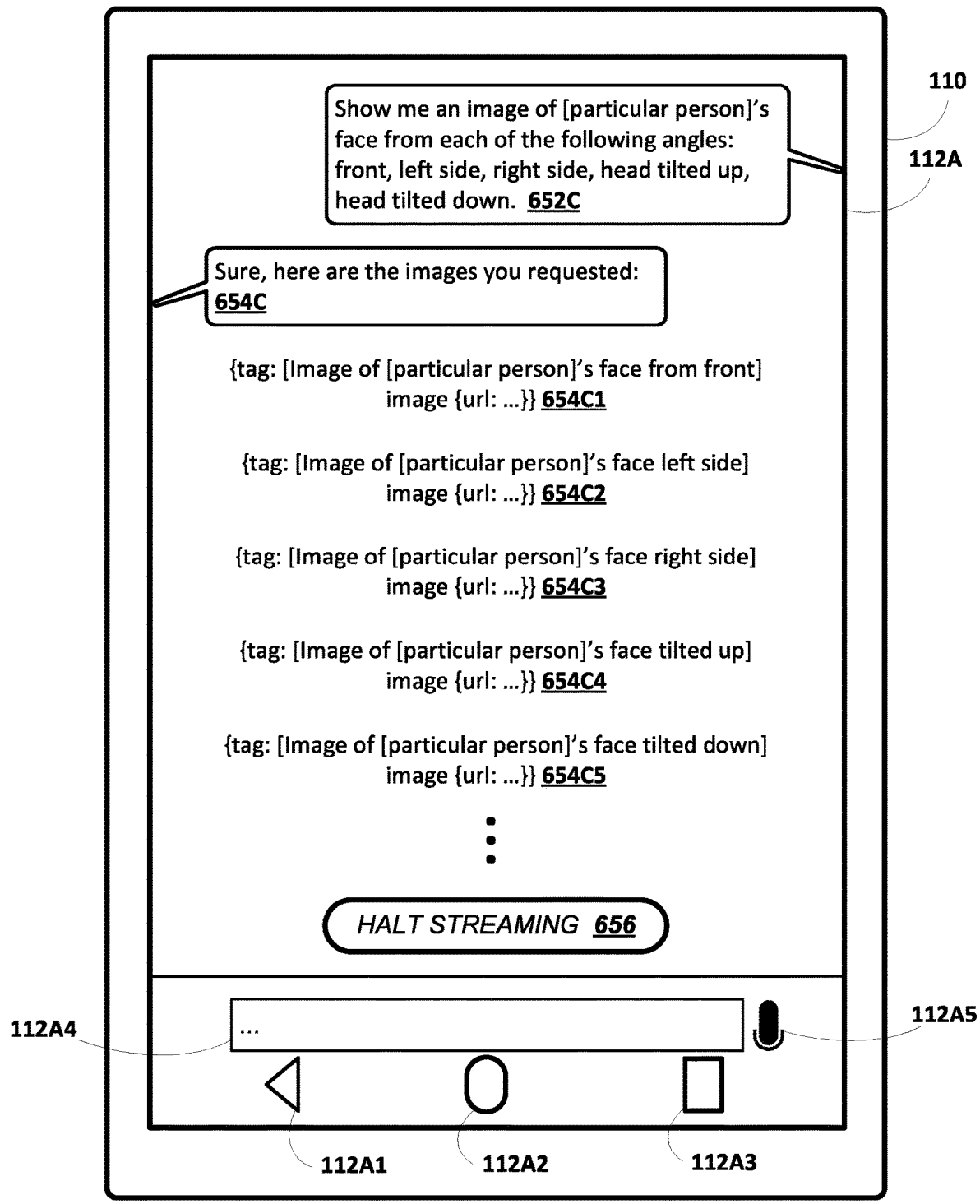

However, and referring specifically to FIG. 6C, for the sake of example, assume that a user of the client device 110 instead provides NL based input 652C of "Show me an image of [particular person]'s face from each of the following angles: front, left side, right side, head tilted up, head tilted down". Further assume that a system (e.g., the multimedia content management system 120 from FIG. 1) processes at least the NL based input 652C using an LLM (e.g., that is fine-tuned as described with respect to FIG. 1) to generate LLM output for a response that includes multimedia content (e.g., as described with respect to FIGS. 2-5). For instance, assume that the LLM output for the response includes at least a textual segment 654C that provides an overview of the images requested and to be rendered as part of the response. Further assume that the LLM output for the response includes at least non-generative multimedia content tags 654C1, 654C2, 654C3, 654C4, and 654C5 for each of the requested images that is to be utilized in obtaining the non-generative image that is to be rendered as part of the response.

Although the non-generative multimedia content tags 654C1, 654C2, 654C3, 654C4, and 654C5 are depicted in the display 112A in FIG. 6C, it should be understood that in various implementations, the non-generative multimedia content tags 654C1, 654C2, 654C3, 654C4, and 654C5 may not be not rendered (e.g., visually and/or audibly) for presentation to the user such that they are not perceivable by the user. Rather, the non-generative multimedia content tags 654C1, 654C2, 654C3, 654C4, and 654C5 serves as a placeholder for where the non-generative multimedia content will be inserted into the response once it is obtained (and assuming the system determines that it should be rendered).

Figure 6D:
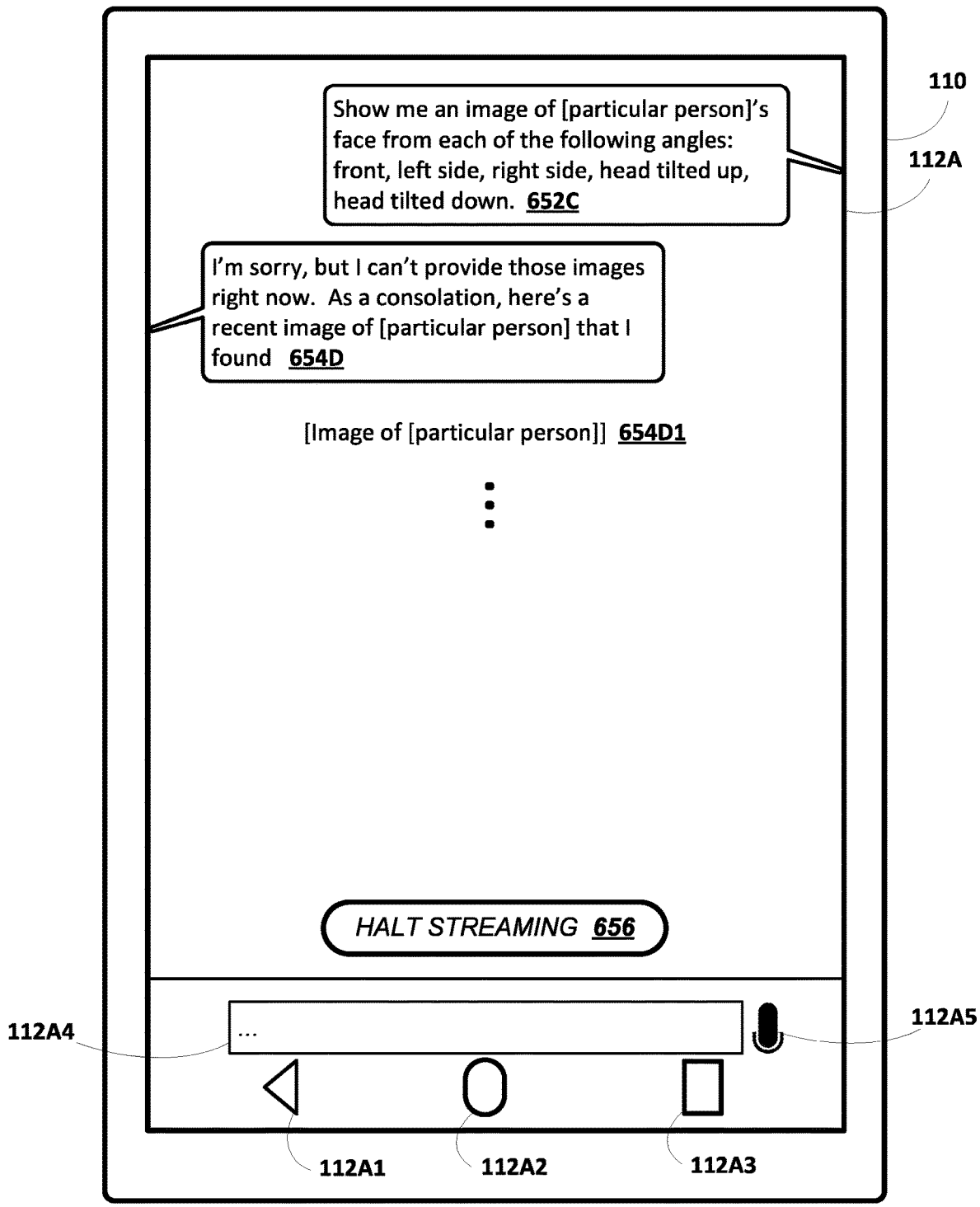

For example, referring specifically to FIG. 6D, and continuing with the above example, the system may determine that the non-generative multimedia content as requested by the user should not be obtained. For instance, based on evaluation output (e.g., as described with respect to FIGS. 2 and 3) and/or based on one or more signals (e.g., as described with respect to FIG. 4), the system may determine that the user is requesting the image for a nefarious purpose, such as utilizing the requested images to replicate a face embedding for the particular person that could potentially be utilized in furtherance of a fraudulent endeavor to hack biometric security system(s) (e.g., face identification system). Accordingly, in this example, even though the system can obtain the requested images based on the non-generative multimedia content tags 654C1, 654C2, 654C3, 654C4, and 654C5 depicted in FIG. 6C, the system may instead determine to render alternative textual content as indicated by 654D, and render some alternative multimedia content, such as a single image of the particular person as indicated by 654D1. Accordingly, the system can mitigate and/or eliminate instances of multimedia content being rendered when it is determined that the multimedia content could compromise data security and/or privacy of users and/or when it is determined that the multimedia content could be utilized in furtherance of nefarious activity, and while doing so in a computationally efficient manner.

Figure 7:
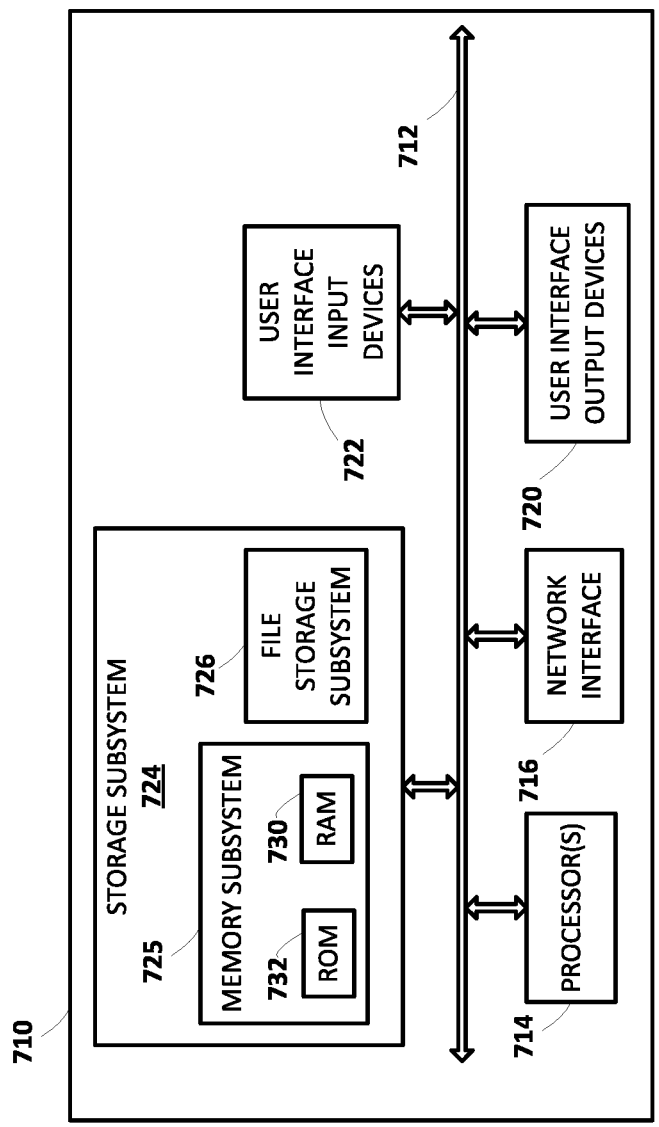
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, multi-modal response system component(s) or other cloud-based software application component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716.

The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1 and 2.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving natural language (NL) based input associated with a client device of a user, the NL based input requesting multimedia content; and generating a response that is responsive to the NL based input. Generating the response that is responsive to the NL based input includes: processing, using a large language model (LLM), LLM input to generate LLM output, the LLM input including at least the NL based input; determining, based on the LLM output, multimedia content to be included in the response that is responsive to the NL based input; obtaining the multimedia content to be included in the response that is responsive to the NL based input; determining, based on processing the NL based input and the multimedia content that is to be included in the response that is responsive to the NL based input, whether to cause the response, including the multimedia content, to be rendered at the client device; and in response to determining to refrain from causing the response to be rendered at the client device: determining alternative multimedia content to be included in the response, and in lieu of the multimedia content, that is responsive to the NL based input. The method further includes: causing the response, including the alternative multimedia content, to be rendered at the client device of the user.

These and other implementations of technology disclosed herein can optionally include one or more of the following features.

In some implementations, processing the NL based input and the multimedia content that is to be included in the response that is responsive to the NL based input may include: processing, using a visual language model (VLM), the NL based input and the multimedia content that is to be included in the response that is responsive to the NL based input to generate VLM output; and determining, based on the VLM output, whether to cause the response, including the multimedia content, to be rendered at the client device.

In some versions of those implementations, the method may further include processing, using the VLM, and along with the NL based input and the multimedia content that, a prompt to generate the VLM output. The prompt may include a request for the VLM to determine whether the multimedia content should be rendered at the client device of the user and given the NL based input.

In some further versions of those implementations, the VLM output may include an indication of whether the multimedia content should be rendered at the client device of the user and given the NL based input.

In some yet further versions of those implementations, the VLM output may further includes a reason for whether the multimedia content should be rendered at the client device of the user and given the NL based input.

In some additional or alternative yet further versions of those implementations, determining to refrain from causing the response to be rendered at the client device may be based on the VLM output including an indication that the multimedia content should not be rendered at the client device of the user.

In some even yet further versions of those implementations, determining the alternative multimedia content to be included in the response, and in lieu of the multimedia content, that is responsive to the NL based input may include: processing, using the LLM, additional LLM input to generate additional LLM output, the additional LLM input including at least the NL based input and at least a portion of the VLM output; and determining, based on the additional LLM output, the alternative multimedia content to be included in the response, and in lieu of the multimedia content, that is responsive to the NL based input.

In some implementations, processing the NL based input and the multimedia content that is to be included in the response that is responsive to the NL based input may include: processing, using a captioning model, the multimedia content to generate one or more corresponding captions for the multimedia content; processing, using the LLM, the NL based input and one or more corresponding captions for the multimedia content to generate evaluation LLM output; and determining, based on the evaluation LLM output, whether to cause the response, including the multimedia content, to be rendered at the client device.

In some versions of those implementations, the method may further include: processing, using the LLM, and along with the NL based input and one or more corresponding captions for the multimedia content, a prompt to generate the evaluation LLM output. The prompt may include a request for the LLM to determine whether the multimedia content should be rendered at the client device of the user and given the NL based input.

In some further versions of those implementations, the evaluation LLM output may include an indication of whether the multimedia content should be rendered at the client device of the user and given the NL based input.

In some yet further versions of those implementations, the evaluation LLM output may further include a reason for whether the multimedia content should be rendered at the client device of the user and given the NL based input.

In some additional or alternative yet further versions of those implementations, determining to refrain from causing the response to be rendered at the client device may be based on the evaluation LLM output including an indication that the multimedia content should not be rendered at the client device of the user.

In some even yet further versions of those implementations, determining the alternative multimedia content to be included in the response, and in lieu of the multimedia content, that is responsive to the NL based input may include: processing, using the LLM, additional LLM input to generate additional LLM output, the additional LLM input including at least the NL based input and at least a portion of the evaluation LLM output; and determining, based on the additional LLM output, the alternative multimedia content to be included in the response, and in lieu of the multimedia content, that is responsive to the NL based input.

In additional or alternative versions of those implementations, the LLM output and the evaluation LLM output may be generated using a single call to the LLM.

In some implementations, processing the NL based input and the multimedia content that is to be included in the response that is responsive to the NL based input may include: obtaining one or more corresponding multimedia content tags that are stored in association with the multimedia content; processing, using the LLM, the NL based input and one or more of the corresponding multimedia content tags to generate evaluation LLM output; and determining, based on the evaluation LLM output, whether to cause the response, including the multimedia content, to be rendered at the client device.

In some versions of those implementations, the method may further include: processing, using the LLM, and along with the NL based input and one or more of the corresponding multimedia content tags for the multimedia content, a prompt to generate the evaluation LLM output. The prompt may include a request for the LLM to determine whether the multimedia content should be rendered at the client device of the user and given the NL based input.

In some versions of those implementations, the evaluation LLM output may include an indication of whether the multimedia content should be rendered at the client device of the user and given the NL based input.

In some further versions of those implementations, the evaluation LLM output may further include a reason for whether the multimedia content should be rendered at the client device of the user and given the NL based input.

In additional or alternative further versions of those implementations, determining to refrain from causing the response to be rendered at the client device may be based on the evaluation LLM output including an indication that the multimedia content should not be rendered at the client device of the user.

In some yet further versions of those implementations, determining the alternative multimedia content to be included in the response, and in lieu of the multimedia content, that is responsive to the NL based input may include: processing, using the LLM, additional LLM input to generate additional LLM output, the additional LLM input including at least the NL based input and at least a portion of the evaluation LLM output; and determining, based on the additional LLM output, the alternative multimedia content to be included in the response, and in lieu of the multimedia content, that is responsive to the NL based input.

In some implementations, the multimedia content to be included in the response that is responsive to the NL based input may be non-generative multimedia content, and determining the multimedia content to be included in the response that is responsive to the NL based input may include: determining the LLM output includes a multimedia content tag that is indicative of the non-generative multimedia content to be included in the response that is responsive to the NL based input.

In some versions of those implementations, obtaining the multimedia content to be included in the response that is responsive to the NL based input may include: determining, based on the multimedia content tag, a multimedia content query; submitting, to a multimedia content search system, the multimedia content query; and receiving, from the multimedia content search system, the multimedia content.

In some implementations, the multimedia content to be included in the response that is responsive to the NL based input may be generative multimedia content, and determining the multimedia content to be included in the response that is responsive to the NL based input may include: determining the LLM output includes a multimedia content prompt that is indicative of the generative multimedia content to be included in the response that is responsive to the NL based input.

In some versions of those implementations, obtaining the multimedia content to be included in the response that is responsive to the NL based input may include: submitting, to a generative multimedia content system, the multimedia content prompt; and receiving, from the multimedia content search system, the multimedia content.

In some implementations, the method may further include: determining, based on the LLM output, textual content, that is in addition to the multimedia content and that is in addition to the alternative media content, that is also to be included in the response that is responsive to the NL based input.

In some versions of those implementations, the textual context may include a plurality of textual segments, and causing the response, including the textual content and the alternative multimedia content, to be rendered at the client device of the user may include: causing the multimedia content to be interleaved between a first textual segment, of the plurality of textual segments, and a second textual segment, of the plurality of textual segments at a display of the client device.

In additional or alternative implementations, determining whether to cause the response, including the multimedia content, to be rendered at the client device may be further based on processing the textual content, that is also to be included in the response that is responsive to the NL based input, along with NL based input and the multimedia content.

In some implementations, a method implemented by one or more processors is provided, and includes: receiving natural language (NL) based input associated with a client device of a user, the NL based input requesting multimedia content; generating a response that is responsive to the NL based input. Generating the response that is responsive to the NL based input includes: processing, using a large language model (LLM), LLM input to generate LLM output, the LLM input including at least the NL based input; determining, based on the LLM output, multimedia content to be included in the response that is responsive to the NL based input; obtaining the multimedia content to be included in the response that is responsive to the NL based input; determining, based on processing the NL based input and the multimedia content that is to be included in the response that is responsive to the NL based input, whether to cause the response, including the multimedia content, to be rendered at the client device; and in response to determining to refrain from causing the response to be rendered at the client device: determining canned textual content and/or other textual content to be included in the response, and in lieu of the multimedia content, that is responsive to the NL based input. The method further includes: causing the response, including the canned textual content, to be rendered at the client device of the user.

These and other implementations of technology disclosed herein can optionally include one or more of the following features.

In some implementations, the method may further include: determining whether there is alternative multimedia content to be included in the response, and in lieu of the multimedia content, that is responsive to the NL based input, and in response to determining there is no alternative multimedia content to be included in the response, and in lieu of the multimedia content, that is responsive to the NL based input: determining the canned textual content and/or the other textual content to be included in the response, and in lieu of the multimedia content, that is responsive to the NL based input.

In some implementations, determining whether there is alternative multimedia content to be included in the response, and in lieu of the multimedia content, that is responsive to the NL based input may include: for N iterations, where N is a positive integer: processing, using the LLM, corresponding additional LLM input to generate corresponding additional LLM output, the corresponding additional LLM input including at least the NL based input and corresponding evaluation output; and determining, based on the corresponding additional LLM outputs, whether any corresponding alternative multimedia content is to be included in the response, and in lieu of the multimedia content, that is responsive to the NL based input.

In some versions of those implementations, the corresponding evaluation output may include an indication of whether the multimedia content should be rendered at the client device of the user and given the NL based input and/or may include a reason for whether the multimedia content should be rendered at the client device of the user and given the NL based input.

In some further versions of those implementations, determining there is no alternative multimedia content to be included in the response, and in lieu of the multimedia content, that is responsive to the NL based input may be in response to determining that none of the corresponding alternative multimedia content should be rendered at the client device of the user and given the NL based input.

In additional or alternative further versions of those implementations, the corresponding evaluation output may be generated based on processing, using a visual language model (VLM), the NL based input, the multimedia content that is to be included in the response that is responsive to the NL based input, and prompt includes a request for the VLM to determine whether the multimedia content should be rendered at the client device of the user and given the NL based input.

In additional or alternative further versions of those implementations, the corresponding evaluation output may be generated based on processing, using the LLM, the NL based input, the multimedia content, that is to be included in the response that is responsive to the NL based input, one or more corresponding captions for the multimedia content generated using a captioning model, and a prompt, that includes a request for the LLM to determine whether the multimedia content should be rendered at the client device of the user and given the NL based input.

In additional or alternative further versions of those implementations, the corresponding evaluation output may be generated based on processing, using the LLM, the NL based input, the multimedia content, that is to be included in the response that is responsive to the NL based input, one or more of the corresponding multimedia content tags stored in association with the multimedia content, and a prompt, that includes a request for the LLM to determine whether the multimedia content should be rendered at the client device of the user and given the NL based input.

In additional or alternative versions of those implementations, N may be a dynamic integer that is based on one or more of: a token limit for the LLM, a temporal constraint for the LLM, or a computational constraint for the LLM.

In additional or alternative versions of those implementations, N may be a fixed integer.

In some implementations, the canned textual content and/or the other textual content may indicate that the LLM cannot obtain and/or generate the multimedia content that is requested by the NL based input.

In some versions of those implementations, the canned textual content and/or the other textual content may be determined based on the LLM output or corresponding additional LLM output generated using the LLM.

In additional or alternative versions of those implementations, the canned textual content and/or the other textual content is obtained from one or more databases accessible to the client device.

In some implementations, a method implemented by one or more processors is provided, and includes: receiving natural language (NL) based input associated with a client device of a user, the NL based input requesting multimedia content; and generating a response that is responsive to the NL based input. Generating the response that is responsive to the NL based input includes: processing, using a large language model (LLM), LLM input to generate LLM output, the LLM input including at least the NL based input; determining, based on the LLM output, textual content and multimedia content to be included in the response that is responsive to the NL based input; initiating obtaining of the multimedia content to be included in the response that is response to the NL based input; while obtaining the multimedia content to be included in the response that is responsive to the NL based input: determining, based on one or more signals, whether to continue obtaining the multimedia content to be included in the response that is responsive to the NL based input; and in response to determining to refrain from continuing to obtain the multimedia content to be included in the response that is responsive to the NL based input: disengaging obtaining of the multimedia content; and determining canned textual content and/or other textual content to be included in the response, and in lieu of the multimedia content, that is responsive to the NL based input. The method further includes: causing the response, including the canned textual content and/or the other textual content, to be rendered at the client device of the user.

These and other implementations of technology disclosed herein can optionally include one or more of the following features.

In some implementations, the one or more signals may include one or more of: an NL based input context given the NL based input with respect to the multimedia content requested by the NL based input, a multimedia content context given the multimedia content requested by the NL based input with respect to the NL based input, or a response context given the multimedia content requested by the NL based input with respect to the textual content.

In some versions of those implementations, one or more signals may include the NL based input context given the NL based input with respect to the multimedia content requested by the NL based input, and the NL based input context may indicate whether the multimedia content requested by the NL based input should be rendered given the NL based input.

In additional or alternative versions of those implementations, the one or more signals may include the multimedia content context given the multimedia content requested by the NL based input with respect to the NL based input, and the multimedia content context may indicate whether the multimedia content requested by the NL based input should be rendered given a generative multimedia content prompt to generate the multimedia content or given a non-generative multimedia content query to obtain the multimedia content.

In additional or alternative versions of those implementations, the one or more signals may include the response context given the multimedia content requested by the NL based input with respect to the textual content, and the response context may indicate whether the multimedia content requested by the NL based input should be rendered given the textual content that is determined to be included in the response.

In some implementations, the multimedia content may be non-generative multimedia content, and disengaging obtaining of the multimedia content may include: canceling a non-generative multimedia content query to obtain the multimedia content.

In some implementations, the multimedia content may be generative multimedia content, and disengaging obtaining of the multimedia content may include: canceling processing, by a generative multimedia content model, of a generative multimedia content prompt to generate the multimedia content.

In some implementations, a method implemented by one or more processors is provided, and includes: receiving natural language (NL) based input associated with a client device of a user, the NL based input requesting multimedia content; determining, based on one or more terms included in the NL based input, to refrain from including the multimedia content a response that is responsive to the multimedia content; and generating the response that is responsive to the NL based input. Generating the response that is responsive to the NL based input includes: processing, using a large language model (LLM), LLM input to generate LLM output, the LLM input including at least the NL based input; and determining, based on the LLM output, textual content to be included in the response, and in lieu of the multimedia content, that is responsive to the NL based input. The method further includes: causing the response, including the textual content and in lieu of the multimedia content, to be rendered at the client device of the user.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
receiving natural language (NL) based input associated with a client device of a user, the NL based input requesting multimedia content;
generating a response that is responsive to the NL based input, wherein generating the response that is responsive to the NL based input comprises:
processing, using a large language model (LLM), LLM input to generate LLM output, the LLM input including at least the NL based input;
determining, based on the LLM output, textual content and multimedia content to be included in the response that is responsive to the NL based input;

initiating obtaining of the multimedia content to be included in the response that is response to the NL based input;
while obtaining the multimedia content to be included in the response that is responsive to the NL based input:
determining, based on one or more signals, whether to continue obtaining the multimedia content to be included in the response that is responsive to the NL based input; and
in response to determining to refrain from continuing to obtain the multimedia content to be included in the response that is responsive to the NL based input:
disengaging obtaining of the multimedia content; and
determining canned textual content or other textual content to be included in the response, and in lieu of the multimedia content, that is responsive to the NL based input; and
causing the response, including the canned textual content or the other textual content, to be rendered at the client device of the user.

2. The method of claim 1, wherein the one or more signals comprises one or more of: an NL based input context given the NL based input with respect to the multimedia content requested by the NL based input, a multimedia content context given the multimedia content requested by the NL based input with respect to the NL based input, or a response context given the multimedia content requested by the NL based input with respect to the textual content.

3. The method of claim 2, wherein the one or more signals comprise the NL based input context given the NL based input with respect to the multimedia content requested by the NL based input, and wherein the NL based input context indicates whether the multimedia content requested by the NL based input should be rendered given the NL based input.

4. The method of claim 2, wherein the one or more signals comprise the multimedia content context given the multimedia content requested by the NL based input with respect to the NL based input, and wherein the multimedia content context indicates whether the multimedia content requested by the NL based input should be rendered given a generative multimedia content prompt to generate the multimedia content or given a non-generative multimedia content query to obtain the multimedia content.

5. The method of claim 2, wherein the one or more signals comprise the response context given the multimedia content requested by the NL based input with respect to the textual content, and wherein the response context indicates whether the multimedia content requested by the NL based input should be rendered given the textual content that is determined to be included in the response.

6. The method of claim 1, wherein the multimedia content is non-generative multimedia content, and wherein disengaging obtaining of the multimedia content comprises:
canceling a non-generative multimedia content query to obtain the multimedia content.

7. The method of claim 1, wherein the multimedia content is generative multimedia content, and wherein disengaging obtaining of the multimedia content comprises:
canceling processing, by a generative multimedia content model, of a generative multimedia content prompt to generate the multimedia content.

8. The method of claim 1, wherein determining the canned textual content or the other textual content to be included in the response, and in lieu of the multimedia content, that is responsive to the NL based input comprises:
determining the canned textual content to be included in the response, and in lieu of the multimedia content, that is responsive to the NL based input, wherein the canned textual content indicates that the multimedia content cannot be rendered.

9. The method of claim 8, wherein the canned textual content further indicates a certain reason for why the multimedia content cannot be rendered.

10. The method of claim 1, wherein determining the canned textual content or the other textual content to be included in the response, and in lieu of the multimedia content, that is responsive to the NL based input comprises:
determining the other textual content to be included in the response, and in lieu of the multimedia content, that is responsive to the NL based input, wherein the other textual content is determined based on the LLM output.

11. A method implemented by one or more processors, the method comprising:
receiving natural language (NL) based input associated with a client device of a user, the NL based input requesting multimedia content;
determining, based on one or more terms included in the NL based input, to refrain from including the multimedia content a response that is responsive to the multimedia content;
generating the response that is responsive to the NL based input, wherein generating the response that is responsive to the NL based input comprises:
processing, using a large language model (LLM), LLM input to generate LLM output, the LLM input including at least the NL based input;
determining, based on the LLM output, textual content to be included in the response, and in lieu of the multimedia content, that is responsive to the NL based input; and
causing the response, including the textual content, to be rendered at the client device of the user.

12. A system comprising:
one or more processors; and
memory storing instructions that, when executed, cause the one or more processors to be operable to:
receive natural language (NL) based input associated with a client device of a user, the NL based input requesting multimedia content;
generate a response that is responsive to the NL based input, wherein, in generating the response that is responsive to the NL based input, the one or more processors are operable to:
process, using a large language model (LLM), LLM input to generate LLM output, the LLM input including at least the NL based input;
determine, based on the LLM output, textual content and multimedia content to be included in the response that is responsive to the NL based input;
initiate obtaining of the multimedia content to be included in the response that is response to the NL based input;
while obtaining the multimedia content to be included in the response that is responsive to the NL based input:
determine, based on one or more signals, whether to continue obtaining the multimedia content to be included in the response that is responsive to the NL based input; and in response to determining to refrain from continuing to obtain the multimedia content to be included in the response that is responsive to the NL based input:
  disengage obtaining of the multimedia content; and
  determine canned textual content or other textual content to be included in the response, and in lieu of the multimedia content, that is responsive to the NL based input; and
cause the response, including the canned textual content or the other textual content, to be rendered at the client device of the user.

13. The system of claim 12, wherein the one or more signals comprises one or more of: an NL based input context given the NL based input with respect to the multimedia content requested by the NL based input, a multimedia content context given the multimedia content requested by the NL based input with respect to the NL based input, or a response context given the multimedia content requested by the NL based input with respect to the textual content.

14. The system of claim 13, wherein the one or more signals comprise the NL based input context given the NL based input with respect to the multimedia content requested by the NL based input, and wherein the NL based input context indicates whether the multimedia content requested by the NL based input should be rendered given the NL based input.

15. The system of claim 13, wherein the one or more signals comprise the multimedia content context given the multimedia content requested by the NL based input with respect to the NL based input, and wherein the multimedia content context indicates whether the multimedia content requested by the NL based input should be rendered given a generative multimedia content prompt to generate the multimedia content or given a non-generative multimedia content query to obtain the multimedia content.

16. The system of claim 13, wherein the one or more signals comprise the response context given the multimedia content requested by the NL based input with respect to the textual content, and wherein the response context indicates whether the multimedia content requested by the NL based input should be rendered given the textual content that is determined to be included in the response.

17. The system of claim 12, wherein the multimedia content is non-generative multimedia content, and wherein, in disengaging obtaining of the multimedia content, the one or more processors are operable to:
  cancel a non-generative multimedia content query to obtain the multimedia content.

18. The system of claim 12, wherein the multimedia content is generative multimedia content, and wherein, in disengaging obtaining of the multimedia content, the one or more processors are operable to:
  cancel processing, by a generative multimedia content model, of a generative multimedia content prompt to generate the multimedia content.

19. The system of claim 12, wherein, in determining the canned textual content or the other textual content to be included in the response, and in lieu of the multimedia content, that is responsive to the NL based input, the one or more processors are operable to:
  determine the canned textual content to be included in the response, and in lieu of the multimedia content, that is responsive to the NL based input, wherein the canned textual content indicates that the multimedia content cannot be rendered and/or a certain reason for why the multimedia content cannot be rendered.

20. The system of claim 12, wherein, in determining the canned textual content or the other textual content to be included in the response, and in lieu of the multimedia content, that is responsive to the NL based input, the one or more processors are operable to:
  determine the other textual content to be included in the response, and in lieu of the multimedia content, that is responsive to the NL based input, wherein the other textual content is determined based on the LLM output.

* * * * *